(12) United States Patent
Perez Lara et al.

(10) Patent No.: US 12,231,927 B2
(45) Date of Patent: Feb. 18, 2025

(54) VARIABLE ARBITRARY RESAMPLER METHOD FOR BASE STATION TEST SYSTEM

(71) Applicant: VIAVI Solutions Inc., Chandler, AZ (US)

(72) Inventors: Pablo Perez Lara, St Neots (GB); John Dominic Wilson, Welwyn Garden (GB)

(73) Assignee: VIAVI Solutions Inc., Chandler, AZ (US)

( * ) Notice: Subject to any disclaimer, the term of this patent is extended or adjusted under 35 U.S.C. 154(b) by 409 days.

(21) Appl. No.: 17/851,455

(22) Filed: Jun. 28, 2022

(65) Prior Publication Data

US 2023/0422062 A1    Dec. 28, 2023

(51) Int. Cl.
  *H04W 88/08*   (2009.01)
  *H04W 24/06*   (2009.01)

(52) U.S. Cl.
  CPC ............ *H04W 24/06* (2013.01); *H04W 88/08* (2013.01)

(58) Field of Classification Search
  CPC ............... H03H 17/0621; H03H 11/04; H03H 2017/0081; H03H 17/0455; H03H 17/0664; H04L 7/0029; G06F 12/1009; H04W 24/06; H04W 88/08; H04W 24/04; H04B 17/0085
  See application file for complete search history.

(56) References Cited

U.S. PATENT DOCUMENTS

| | | | |
|---|---|---|---|
| 5,818,888 A | 10/1998 | Holmqvist | |
| 6,747,858 B1* | 6/2004 | Sculley | H03H 17/0621 |
| | | | 361/61 |
| 9,699,753 B1 | 7/2017 | You et al. | |
| 2009/0319065 A1* | 12/2009 | Risbo | H03H 17/0628 |
| | | | 341/61 |
| 2013/0066934 A1* | 3/2013 | Edo | H03H 17/0664 |
| | | | 708/313 |

(Continued)

OTHER PUBLICATIONS

Extended European Search Report for Application No. EP23181096, mailed Nov. 27, 2023, 7 Pages.

(Continued)

*Primary Examiner* — Cindy Trandai
(74) *Attorney, Agent, or Firm* — Harrity & Harrity, LLP

(57) ABSTRACT

Method for variable arbitrary resampling that allows a base station test system to correct for sampling frequency errors relative to the base station. An output time calculation module obtains the required output sample times depending on the resampling rate, which can be tuned as needed. An input sample counter module counts the last input sample loaded into a polyphase interpolator, which can calculate any of M interpolated samples between two consecutive input samples. The polyphase interpolator uses the integer part of the required output sample times to decide what interpolated samples to calculate. A sequencer module compares the calculated output times against the input sample count to control all the blocks of the variable arbitrary resampler and determine if the output of the polyphase interpolator is a valid sample. Valid samples are transferred to other subsystems, such as a digital-to-analog data converter or another signal processing module.

20 Claims, 21 Drawing Sheets

(56) References Cited

U.S. PATENT DOCUMENTS

| | | | |
|---|---|---|---|
| 2015/0304660 A1* | 10/2015 | Koike | H04N 19/117 |
| | | | 375/240.02 |
| 2018/0040327 A1* | 2/2018 | Ono | H04R 3/005 |
| 2019/0379408 A1* | 12/2019 | Ma | H03H 17/0621 |
| 2020/0076567 A1* | 3/2020 | Wala | G06F 12/1009 |
| 2021/0351782 A1* | 11/2021 | Bury | H03M 3/462 |
| 2022/0231667 A1* | 7/2022 | Balakrishnan | H03H 11/04 |
| 2024/0012617 A1* | 1/2024 | Tanimoto | G06N 20/00 |

OTHER PUBLICATIONS

Hannes Ramon, et al.; "Efficient Parallelization of Polyphase Arbitrary Resampling FIR Filters for High-Speed Applications"; Mar. 2017; Journal of Signal Processing Systems; pp. 1-9; https://www.researchgate.net/publication/314756038_Efficient_Parallelization_of_Polyphase_Arbitrary_Resampling_FIR_Filters_for_High-Speed_Applications.

Fred Harris, et al.; "Algorithms for Arbitrary Resampling Filters"; Proceeding of the SDR 03 Technical Conference and Product Exposition; SDR Forum; 2003; 7 pages; https://winnf.memberclicks.net/assets/Proceedings/2003/2003-sw3-001-harris.pdf.

* cited by examiner

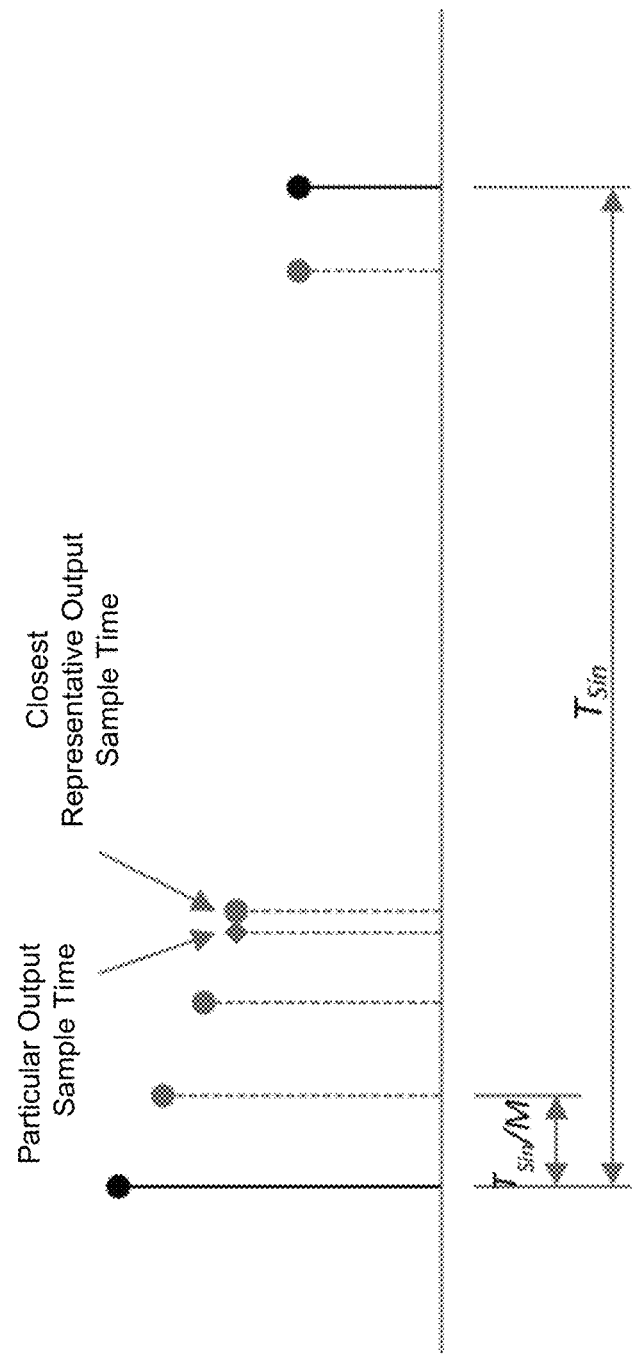

| Used by t[2m] or t[2n+1] | Used by t[2m+2] or t[2n+3] | Shift |
|---|---|---|
| No | No | Yes |
| Yes | No | Yes |
| No | Yes | No |
| Yes | Yes | No |

FIG. 5F

| Direction | $F_{sin}$ (MSPS) | $M \cdot F_{sin}$ (GSPS) | Passband edge | | Stopband edge | |
|---|---|---|---|---|---|---|
| | | | MHz | Normalised to $M \cdot F_{sin}$ | MHz | Normalised to $M \cdot F_{sin}$ |
| Transmitter | 491.52 | 125.82912 | 200 | 0.00159 | 291.52 | 0.002317 |
| Receiver | 500 | 128 | 200 | 0.00156 | 300 | 0.00234 |

| LUT address | Filter coefficients |
|---|---|
| 0 | Lx16-bit values |
| 1 | Lx16-bit values |
| ... | ... |
| 255 | Lx16-bit values |

FIG. 6G

VARIABLE ARBITRARY RESAMPLER METHOD FOR BASE STATION TEST SYSTEM

BACKGROUND

Base station testing is a method used to predict the performance and reliability of a base station, a user equipment, and/or other wireless equipment in actual operation. A base station test may include over the air (OTA) testing (e.g., placing a base station radio unit in a free space environment inside a test chamber in which actual deployment conditions are simulated, and collecting test data via one or more test antennas) and/or wired testing (e.g., connecting cables to components of the base station to collect test data). A base station test system is required to synchronize its radio frequency (RF) center frequency and a sampling frequency of its data converters to the base station, like conventional user equipment (e.g., mobile phones) would. This synchronization process typically involves analyzing RF signals received from the equipment under test (e.g., the base station) with the aim of physically tuning the frequency of the clocks of the base station test system by analog or digital means. Including a tunable clock has an impact on circuit area and cost (e.g., to provide the means to modify a control voltage of the tunable clock). Further a tunable clock typically exhibits worse jitter performance than a fixed frequency clock and requires multiple frequency tuning iterations due to nonidealities of a tuning response. Moreover, this approach inhibits the flexibility demanded in modern modular base station test systems, which need to adapt to very different scenarios, such as testing multiple small base stations operating independently, or testing a massive Multiple Input Multiple Output (MIMO) base station with a large number of RF transceivers.

SUMMARY

Some implementations described herein relate to a base station test system. The base station test system may include one or more memories and one or more processors communicatively coupled to the one or more memories. The base station test system may be configured to determine a pair of input sample counter values associated with a pair of input shift registers of the base station test system. The base station test system may be configured to determine a pair of output sample times associated with two output sample periods of the base station test system. The base station test system may be configured to determine, based on the pair of input sample counter values and the pair of output sample times, that a pair of output sample values can be calculated. The base station test system may be configured to cause, based on determining that the pair of output sample values can be calculated, the pair of output sample values to be calculated. The base station test system may be configured to cause the pair of output sample values to be provided to a component of the base station test system.

Some implementations described herein relate to a non-transitory computer-readable medium that stores a set of instructions for a base station test system. The set of instructions, when executed by one or more processors of the base station test system, may cause the base station test system to determine a pair of output sample times. The set of instructions, when executed by one or more processors of the base station test system, may cause the base station test system to determine, based on the pair of output sample times, that a pair of output sample values can be calculated. The set of instructions, when executed by one or more processors of the base station test system, may cause the base station test system to cause, based on determining that the pair of output sample values are to be calculated, the pair of output sample values to be calculated. The set of instructions, when executed by one or more processors of the base station test system, may cause the base station test system to cause the pair of output sample values to be provided to a component of the base station test system.

Some implementations described herein relate to a method. The method may include determining, by a base station test system and based on a pair of output sample times, that a pair of output sample values can be calculated. The method may include causing, by the base station test system and based on determining that the pair of output sample values can be calculated, the pair of output sample values to be calculated. The method may include causing, by the base station test system, the pair of output sample values to be provided.

BRIEF DESCRIPTION OF THE DRAWINGS

FIGS. 1A and 1B are diagrams of one or more example implementations associated with a test system described herein.

FIGS. 5A-5F are diagrams of one or more example implementations associated with a sequencer module of the test system described herein.

FIGS. 6A-6G are diagrams of one or more example implementations associated with a polyphase interpolator module of the test system described herein.

DETAILED DESCRIPTION

Figure 1A:
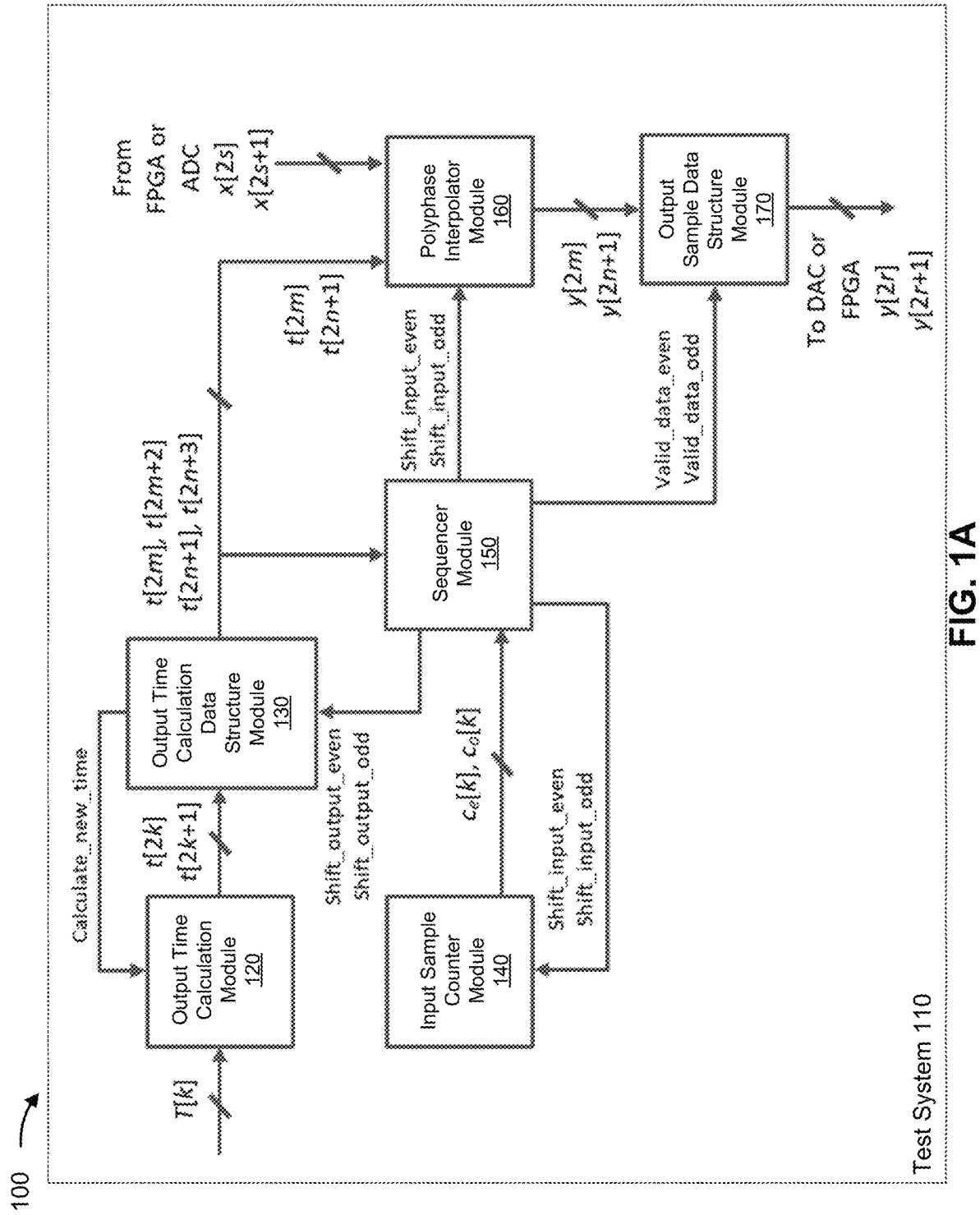

The following detailed description of example implementations refers to the accompanying drawings. The same reference numbers in different drawings may identify the same or similar elements.

A base station test system generates and transmits radio frequency (RF) signals to a base station (e.g., that is tested by the base station test system), and analyzes RF signals that are received by the base station test system (e.g. that are generated and transmitted by the base station). Accordingly, the base station test system needs to synchronize its center and sampling frequency with that of the base station. This becomes complex when the base station test system employs multiple transceivers (e.g., wherein each transceiver includes a transmitter and a receiver) and the base station is associated with wide bandwidth applications, such as fifth generation (5G) network applications (e.g., due to timing closure issues).

In some cases, the base station test system can utilize a sampling frequency error correction technique that utilizes a variable delay filter. However, this technique requires substantial use of computing resources (e.g., processing resources, memory resources, communication resources, and/or power resources, among other examples). For example, hundreds or thousands of offset and slope values are generated, stored, processed, and/or otherwise processed to calculate filter coefficients of the variable delay filter to generate an output sample value. Further, in many cases, a radio access technology (RAT) rate of a base station test system (e.g., an input sample rate of the base station test system) can be, for example, 122.88 megasamples per second (MSPS), 245.76 MSPS, or 491.52 MSPS, while a data converter rate of the base station test system (e.g., an output sample rate of the base station test system) can be, for example, 500 MSPS. Consequently, a ratio of an input sample rate to the output sample rate is often not an integer value, and therefore an integer resampling technique cannot practically be used. For example, in many cases, when the base station test system uses RF data converters, maximizing the converter rate may be critical to simplify a hardware design of the base station test system, which may result in a non-integer ratio between the input sample rate and the output sample rate.

Some implementations described herein provide a test system that is configured to test a base station. The test system generates a pair of output sample values based on a pair of output sample times and a pair of input sample values that correspond to the pair of output sample times. For example, the test system may include a polyphase interpolator that includes two finite impulse response (FIR) filters to calculate up to two output samples per clock cycle. The interpolation filter of the polyphase interpolator is stored in memory as M branch filters, where the M branch filters are respectively associated with M representative output sample times of the output sample rate of the test system. Accordingly, for each output sample time of the pair of output sample times, the test system may identify a particular representative output sample time that is closest to the output sample time, read from memory the coefficients of the corresponding branch filter, and program said coefficients into the corresponding FIR filter. The corresponding FIR filter may determine, based on a corresponding input sample value of the pair of input sample values and the representative output sample time, a corresponding output sample value of the pair of output sample values.

In this way, the test system is able to generate two output sample values (e.g., in parallel, such as in a single clock cycle) using only two instances of an FIR filter (and also refraining from using one or more other M branch filters to generate the two output sample values). The two output sample values can then be provided to another component of the test system, such as a digital to analog converter or another signal processing block. The test system therefore uses fewer computing resources (e.g., processing resources, memory resources, communication resources, and/or power resources, among other examples) than that of a base station test system that uses a sampling frequency error correction technique that utilizes a variable delay filter (e.g., because the test system does not need to calculate the filter coefficients for each output sample).

Further, the test system has advantages over traditional approaches which tune the frequency of an analog clock to correct for sampling frequency errors. For example, the test system may use a fixed frequency clock that occupies less area and has an improved jitter performance than the clock of a base station test system which tunes the clock frequency to remove sampling frequency errors. Further, a sample frequency error can be removed more quickly from the test system than a base station test system that utilizes a tunable frequency clock because the test system does not rely on a linearity of a tuning response (e.g., due to analog tuning) of an oscillator, unlike the base station test system that utilizes an analog solution (e.g., that requires an oscillator to be tuned, using analog tuning, based on an output voltage of another component, such as a digital-to-analog converter (DAC), of the base station test system).

FIGS. 1A and 1B are diagrams of one or more example implementations 100 described herein. As shown in FIG. 1A, example implementation(s) 100 may include a test system 110 (e.g., a base station test system that is configured to test a base station). As shown in FIG. 1A, the test system 110 may include an output time calculation module 120, an output time calculation data structure module 130, an input sample counter module 140, a sequencer module 150, a polyphase interpolator module 160, and/or an output sample data structure 170 (e.g., that are associated with a variable arbitrary resample functionality of the test system 110).

The test system 110 may be configured to produce multiple output sample values per clock cycle associated with the test system 110, based on input sample data received by the test system 110 (e.g., from a field programmable gate array (FPGA) and/or an analog-to-digital converter (ADC), not shown in FIGS. 1A-1B, at an input sample rate that is different than the output sample rate). For example, FIG. 1A shows the test system 110 receiving input sample data (shown as input sample values $x[2s]$ and $x[2s+1]$), and the test system 110 processing (e.g., using the polyphase interpolator module 160) the input sample data to generate output sample values (shown as output sample values $y[2m]$ and $y[2n+1]$). The test system 110 may store (e.g., using the output sample data structure 170) the output sample values and may provide a pair of output sample values (shown as output sample values $y[2r]$ and $y[2r+1]$) for further processing by the test system 110 (e.g., by a digital-to-analog converter (DAC), another FPGA, or another baseband processing component, of the test system 110). While example implementations are described herein in relation to generating two output sample values (e.g., per clock cycle associated with the output sample rate of the test system 110), other implementations may include the test system 110 generating any number of output sample values (per clock cycle), such as 3, 4, 5, 6, 7, 8, or more output sample values.

Figure 2:
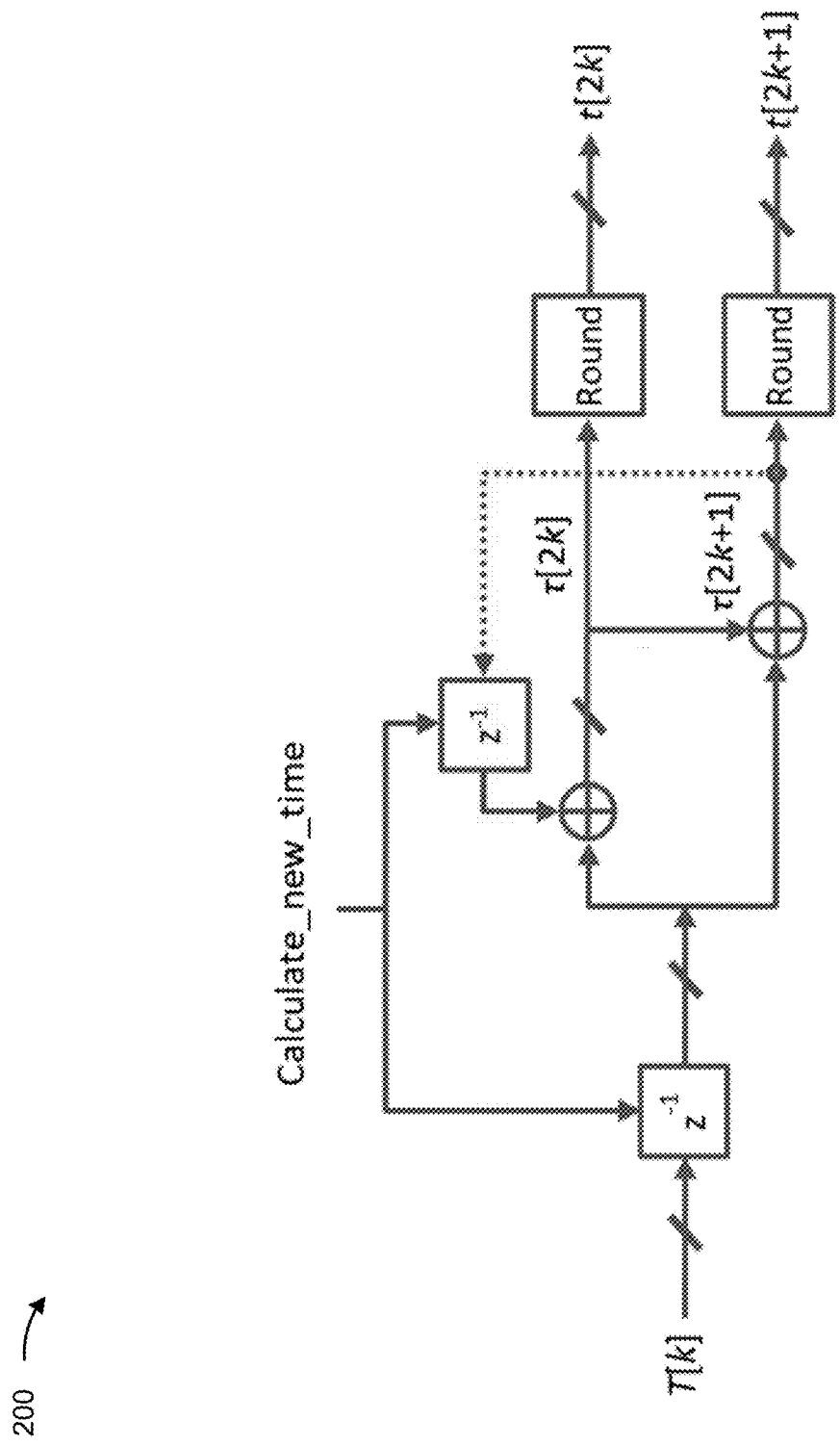
FIG. 2 is a diagram of one or more example implementations associated with an output time calculation module of the test system described herein.

As further shown in FIG. 1A, the test system 110 (e.g., using the output time calculation module 120) may calculate output sample times (e.g., $t[2k]$ and $t[2k+1]$) of an output sample period (e.g., $T[k]$, a normalized output sample period), as further described herein in relation to FIG. 2. The test system 110 (e.g., using the output time calculation data structure module 130) may store the output sample times (e.g., $t[2k]$ and $t[2k+1]$), as further described herein in relation to FIG. 3. As further shown in FIG. 1A, the test system 110 (e.g., using the input sample counter module 140) may determine input sample counter values (e.g., $c_e[k]$ and $c_o[k]$, which each indicate a number of input sample values shifted into a corresponding input shift register of the test system 110), as further described herein in relation to FIG. 4. Accordingly, the test system 110 (e.g., using the sequencer module 150) may determine that output sample values can be calculated, such as by comparing the input sample counter values (e.g., $c_e[k]$ and $c_o[k]$) and pairs of stored output sample times (e.g., output sample pairs t[2m], t[2m+2] and t[2n+1], t[2n+3]), as further described herein in relation to FIGS. 5A-5F.

As further shown in FIG. 1A, based on determining that the output sample values can be calculated, the test system 110 (e.g., using the sequencer module 150 and the polyphase interpolator module 160) may generate the output sample values (e.g., y[2m] and y[2n+1], which respectively correspond to output sample times t[2m] and t[2n+1]), based on the input sample data (e.g., input sample values x[2s] and x[2s+1]), as further described in relation to FIGS. 6A-6G. As shown in FIG. 1B, the test system 110 (e.g., using the polyphase interpolator module 160) may identify M representative output sample times of an input sample period $T_{Sin}$ associated with the input sample data. For example, the test system 110 (e.g., using the polyphase interpolator module 160) may divide $T_{Sin}$ by M to identify the M representative output sample times (e.g., where a length of time of each representative output sample time is equal to $T_{Sin}/M$). Accordingly, the test system 110 (e.g., using the polyphase interpolator module 160) may identify a particular representative output sample time that is closest to a particular output sample time (e.g., t[2m] or t[2n+1])). The test system 110 (e.g., using the polyphase interpolator module 160) may therefore generate a corresponding output sample value (e.g., y[2m] or y[2n+1]) based on the representative output sample time and a corresponding input sample value (x[2s] and x[2s+1]) of the input sample data.

In this way, the test system 110 (e.g., using the polyphase interpolator module 160) may only generate, per one clock cycle associated with the test system 110, output sample values that are associated with a particular number of representative output sample times (e.g., two output sample values y[2m] or y[2n+1] when there are two output sample times t[2m] and t[2n+1]), rather than generating an output sample value for each of the M representative output sample times. This reduces the usage of computing resources (e.g., processing resources, memory resources, communication resources, and/or power resources, among other examples) that would otherwise be utilized to generate output samples for representative output sample times that are to not be further utilized by the test system 110. Additionally, when M is significantly large (e.g., M≥256), using a particular representative output sample time (e.g., that is close, but not equal to, a particular output sample time) has a negligible jitter effect on the output sample data.

As further shown in FIG. 1A, the test system 110 (e.g., using the sequencer module 150) may determine that the output sample values are valid, as further described herein in relation to FIGS. 5A-5F. Accordingly, the test system 110 (e.g., using the output sample data structure 170) may store the output sample values and may provide pairs of stored output sample values (e.g., output sample value pairs y[2r], y[2r+1]) for further processing by the test system 110 (e.g., by the DAC, the FPGA, or another baseband processing component, of the test system 110), as further described herein in relation to FIG. 7.

As indicated above, FIGS. 1A and 1B are provided merely as one or more examples. Other examples may differ from what is described with regard to FIGS. 1A and 1B.

FIG. 2 is a diagram of one or more example implementations 200 associated with the output time calculation module 120 of the test system 110 described herein. As described herein in relation to FIG. 1A, the output time calculation module 120 may calculate a plurality of output sample times of an output sample period (per cycle of the clock used by the test system 110 for digital signal processing). For example, as shown in FIG. 2 (e.g., when a test system signal processing chain operates with two output samples per clock cycle), the output time calculation module 120 may calculate two output sample time instants τ[2k] and τ[2k+1] of an output sample period T[k]. T[k] may be a normalized output sample period, which allows control of the resampling ratio. Accordingly, τ[2k] and τ[2k+1], and T[k] may be described as follows (where $F_{Sin}$ is an input sample rate of the test system 110 and $F_{Sout}$ is the output sample rate of the test system 110):

$$\tau[2k]=\tau[2k-1]+T[k] \qquad \text{Eq. 1}$$

$$\tau[2k+1]=\tau[2k]+T[k] \qquad \text{Eq. 2}$$

$$T[k]=F_{Sin}/F_{Sout}[k] \qquad \text{Eq. 3}$$

In some implementations, the test system 110 may perform one or more interpolation processing steps (e.g., as described elsewhere herein) or decimation processing steps based on the output sample period T[k]. For example, when ½≤T[k]≤2, the test system 110 may interpolate or decimate by a maximum factor of 2.

As further shown in FIG. 2, the output time calculation module 120 may process the output sample period T[k] (e.g., that is represented as 2 integer bits and 32 fractional bits) to generate the two output sample time instants τ[2k] and τ[2k+1] (e.g., that are each represented as 16 integer bits and 32 fractional bits). As further shown in FIG. 2, the output time calculation module 120 may respectively round the two output sample time instants τ[2k] and τ[2k+1] to generate the output sample times t[2k] and t[2k+1] (e.g., that are each represented as 16 integer bits and 8 fractional bits). That is, the sample time instants τ[2k] and τ[2k+1] may each be represented by a first number of fractional bits (e.g., 32 fractional bits), and the output sample times t[2k] and t[2k+1] may each be represented by a second number of fractional bits (e.g., 8 fractional bits), where the first number is greater than the second number.

In some implementations, respective fractional bits of the output sample times t[2k] and t[2k+1] may be used to select respective branches of a polyphase interpolator (e.g., that is associated with the polyphase interpolator module 160), as further described herein in relation to FIGS. 6A-6G. Additionally, or alternatively, respective integer bits of the output sample times t[2k] and t[2k+1] may be used by the sequencer module 150, as further described herein in relation to FIGS. 5A-5F.

Figure 3:
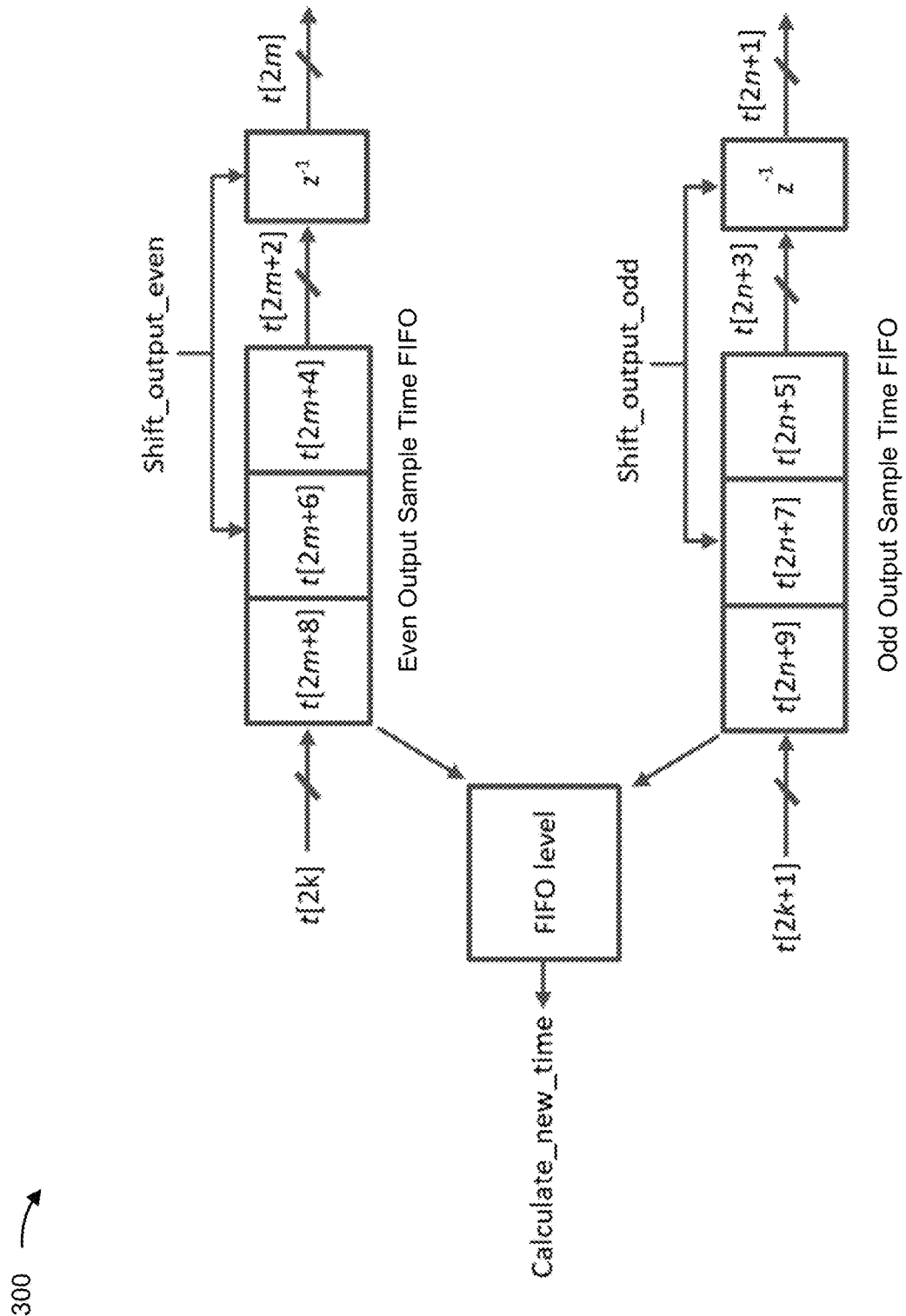
FIG. 3 is a diagram of one or more example implementations associated with an output time calculation data structure module of the test system described herein.

In some implementations, the output time calculation module 120 may process the output sample period T[k] to generate the output sample time instants τ[2k] and τ[2k+1] when the output time calculation module 120 receives a signal (e.g., shown in FIG. 2 as a Calculate_new_time signal), such as from the output time calculation data structure module 130, as further described herein in relation to FIG. 3. Therefore, based on receiving the signal, the output time calculation module 120 may generate the output sample times t[2k] and t[2k+1] (e.g., based on the output sample time instants τ[2k] and τ[2k+1]). In some implementations, the output sample times t[2k] and t[2k+1] may be respectively referred to as the "even" output sample time t[2k] and the "odd" output sample time t[2k+1].

As indicated above, FIG. 2 is provided merely as one or more examples. Other examples may differ from what is described with regard to FIG. 2.

FIG. 3 is a diagram of one or more example implementations 300 associated with the output time calculation data structure module 130 of the test system 110 described herein. As described herein in relation to FIG. 1A, the output time calculation data structure module 130 may store the plurality of output sample times (e.g., that are generated by the output time calculation module 120), such as in one or more first-in-first-out data structures (FIFOs), one or more shift registers, or one or more other data structures. For example, as shown in FIG. 3, the even output sample time t[2k] may be stored in an even output sample time FIFO and the odd output sample time t[2k+1] may be stored in an odd output sample time FIFO.

As further shown in FIG. 3, each FIFO may include (e.g., store) one or more other output sample times (e.g., that were previously generated by the output time calculation module 120). For example, the even output sample time FIFO may include one or more other even output sample times t[2m], t[2m+2], t[2m+4], t[2m+6], t[2m+8], and so on (e.g., in order of greatest amount of time in the even output sample time FIFO), and the odd output sample time FIFO may include one or more other odd output sample times t[2n+1], t[2n+3], t[2n+5], t[2n+7], t[2n+9], and so on (e.g., in order of greatest amount of time in the odd output sample time FIFO).

In some implementations, the sequencer module 150 may send signals to the output time calculation data structure module 130 to cause the FIFOs and/or shift registers to respectively shift (and provide) at least one output sample time from the FIFOs and/or shift registers to the sequencer module 150, as further described herein in relation to FIGS. 5A-5G. For example, the sequencer module 150 may send a Shift_output_even signal to the output time calculation data structure module 130, which may cause the even output sample time FIFO and/or an associated shift register to shift up to two even output sample times (e.g., even output sample times t[2m] and t[2m+2]) to the sequencer module 150, and the sequencer module 150 may send a Shift_output_odd signal to the output time calculation data structure module 130, which may cause the odd output sample time FIFO and/or an associated shift register to shift up to two odd output sample times (e.g., odd output sample times t[2n+1] and t[2n+3]) to the sequencer module 150.

The sequencer module 150 may send the signals to the output time calculation data structure module 130 to cause the FIFOs and/or shift registers to provide one or more pairs of output sample times, where each pair includes an even output sample time and an odd output sample time (e.g., output sample pairs t[2m], t[2m+2] and t[2n+1], t[2n+3]). For example, in some implementations, the output time calculation module 120 may generate only one output sample time for a particular cycle of the clock used by the test system for signal processing and therefore, an even output sample time and an odd output sample time of a particular pair of output sample times may each be associated with a different clock cycle. Accordingly, to obtain an even output sample time and an odd output sample time that are associated with a same clock cycle, the sequencer module 150 may send signals to the output time calculation data structure module 130 to cause the FIFOs and/or shift registers to provide two pairs of output sample times. In some implementations, the sequencer module 150 may use the one or more pairs of output sample times to facilitate generating a plurality of output sample values, as further described herein in relation to FIGS. 5A-5G.

In some implementations, when a number of output sample times in the even output sample time FIFO satisfies (e.g., is less than or equal to) a FIFO level threshold, and/or a number of output sample times in the odd output sample time FIFO satisfies (e.g., is less than or equal to) the FIFO level threshold, the output time calculation data structure module 130 may generate and send a signal (e.g., a Calculate_new_time signal) to the output time calculation module 120 to cause the output time calculation module 120 to generate new output sample times (e.g., as described herein in relation to FIG. 2).

As indicated above, FIG. 3 is provided merely as one or more examples. Other examples may differ from what is described with regard to FIG. 3.

Figure 4:
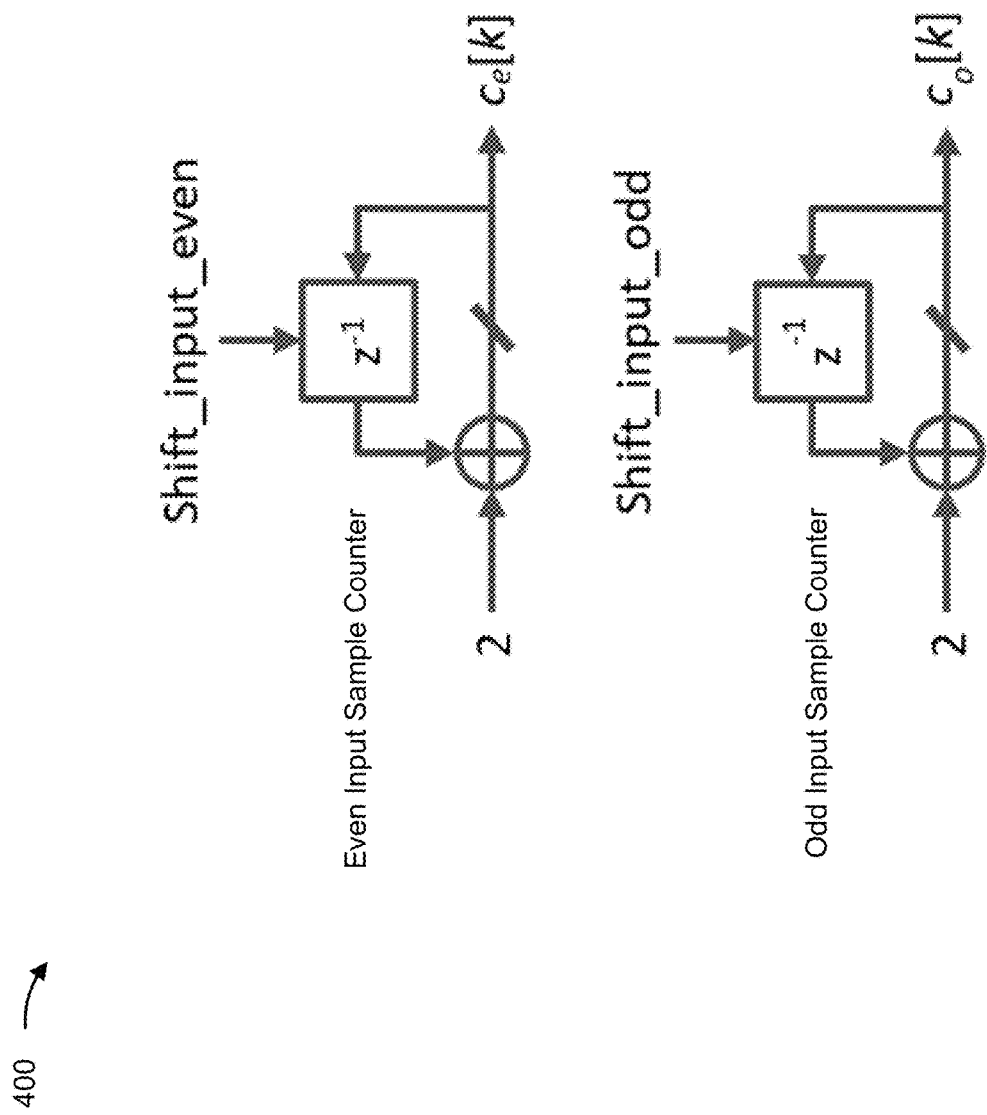
FIG. 4 is a diagram of one or more example implementations associated with an input sample counter module of the test system described herein.

FIG. 4 is a diagram of one or more example implementations 400 associated with the input sample counter module 140 of the test system 110 described herein. As described herein in relation to FIG. 1A, the input sample counter module 140 may determine input sample counter values and provide the input sample counter values to the sequencer module 150 (e.g., to enable the sequencer module 150 to determine whether output samples can be calculated that correspond to output sample times generated by the output time calculation module 120).

In some implementations, the input sample counter module 140 may include a plurality of input sample counters. For example, as shown in FIG. 4, the input sample counter module 140 may include an even input sample counter and an odd input sample counter. The even input sample counter may provide a count of a number of input sample values shifted into an even input shift register of the test system 110 (shown in FIG. 6F), and the odd input sample counter may provide a count of a number of input sample values shifted into an odd input shift register of the test system 110 (also shown in FIG. 6F). For example, as further shown in FIG. 4, respective counts of the plurality of input sample counters may increase by 2 each time input sample values are shifted into corresponding input shift registers.

In some implementations, the sequencer module 150 may send signals to the input sample counter module 140 to cause the plurality of input sample counters to provide input sample counter values to the sequencer module 150. For example, the sequencer module 150 may send a Shift_input_even signal to the input sample counter module 140, which may cause the even input sample counter to increase an even input sample counter value $c_e[k]$ provided to the sequencer module 150 (e.g., that indicates the number of even input sample values shifted into the even input shift register of the test system 110), and the sequencer module 150 may send a Shift_input_odd signal to the input sample counter module 140, which may cause the odd input sample counter to increase an odd input sample counter value $c_o[k]$ provided to the sequencer module 150 (e.g., that indicates the number of odd input sample values shifted into the odd input shift register of the test system 110). Each of the even input sample counter value $c_e[k]$ and the odd input sample counter value $c_o[k]$ may be represented by, for example, 16 integer bits.

As indicated above, FIG. 4 is provided merely as one or more examples. Other examples may differ from what is described with regard to FIG. 4.

FIGS. 5A-5F are diagrams of one or more example implementations 500 associated with the sequencer module 150 of the test system 110 described herein. As described herein in relation to FIG. 1A, the sequencer module 150 may determine whether output sample values (e.g., that correspond to output sample times) can be calculated.

In some implementations, the sequencer module 150 may compare an output sample time (e.g., that is associated with an output sample at the output sample rate of the test system 110) and an input sample counter value (e.g., that indicates a number of input sample values shifted into an input shift register) to determine whether an output sample value (e.g., that is associated with the output sample time) can be calculated (e.g., because the polyphase interpolator module 160 generates input sample values at $(a+b/M) \cdot T_{Sin}$, where a is an integer, and $b=0, \ldots, M-1$). For example, the sequencer module 150 may determine whether an integer portion of a bit representation of the output sample time (e.g., that includes 16 integer bits) matches (e.g., is equal to) a bit representation of the input sample counter value (e.g., that includes 16 integer bits). When the sequencer module 150 determines that there is a match, the sequencer module 150 may determine that the output sample value can be calculated. Alternatively, when the sequencer module 150 determines that there is no match, the sequencer module 150 may determine that the output sample value cannot be calculated and/or that the output sample time is to be compared with another input sample counter value (e.g., that indicates an updated number of input sample values shifted into the input shift register) to determine whether the output sample value can be calculated.

Figure 5A:
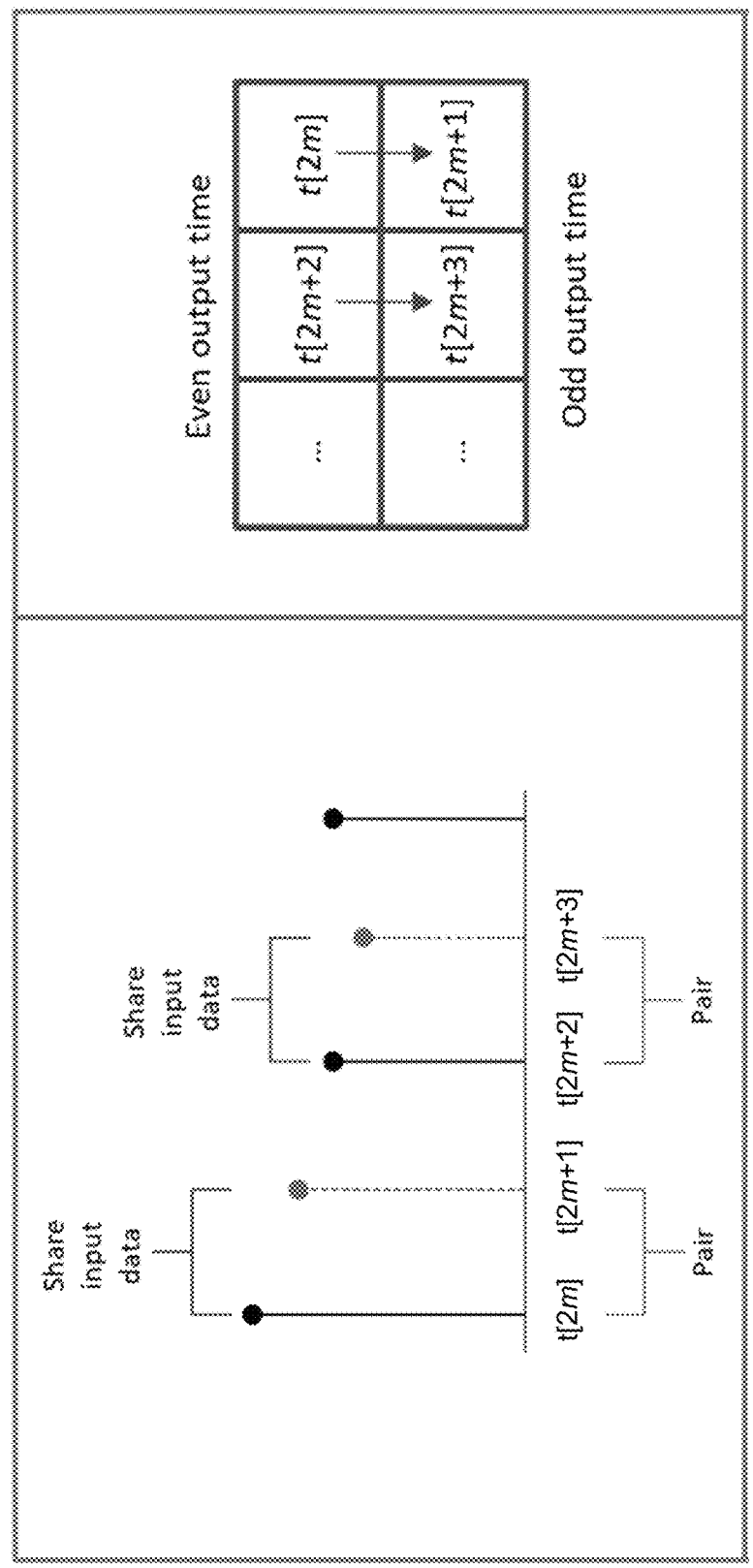
Figure 5B:
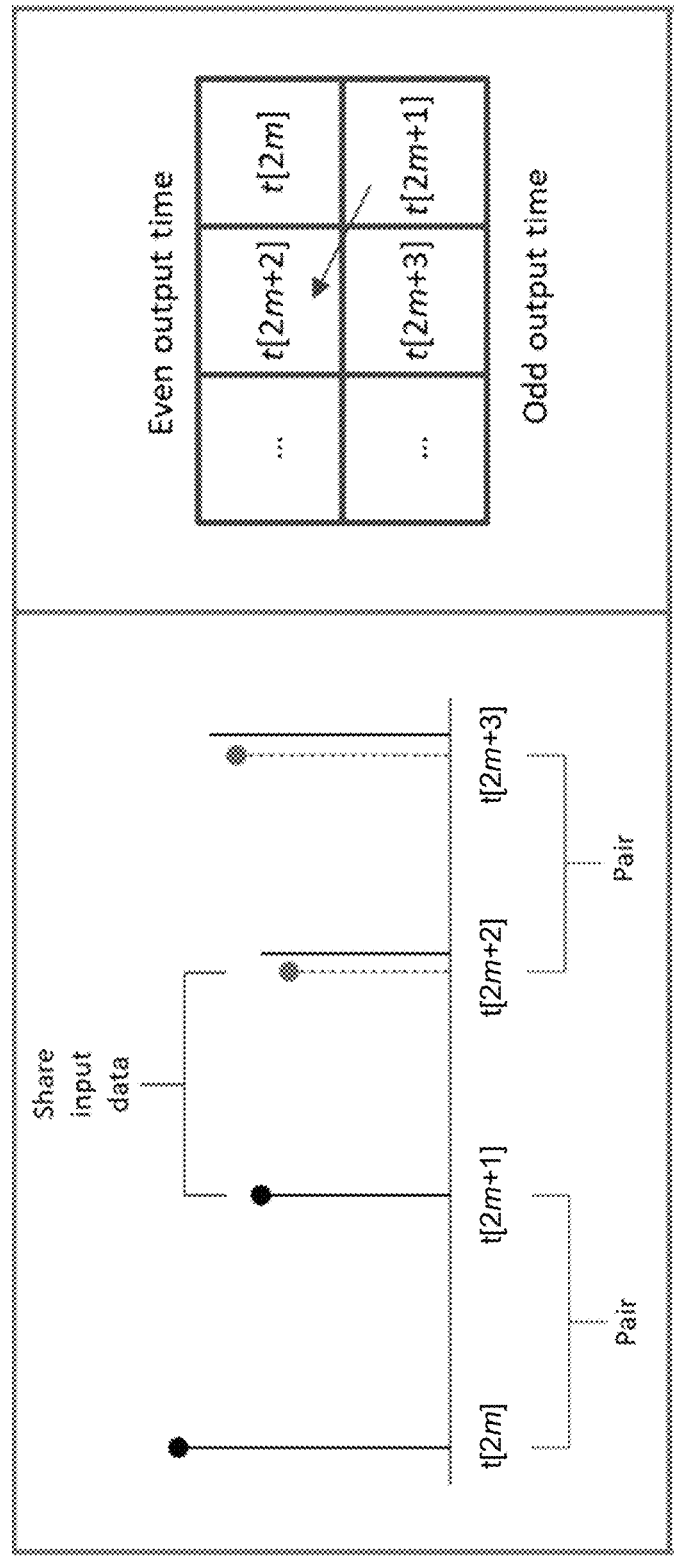
Figure 5C:
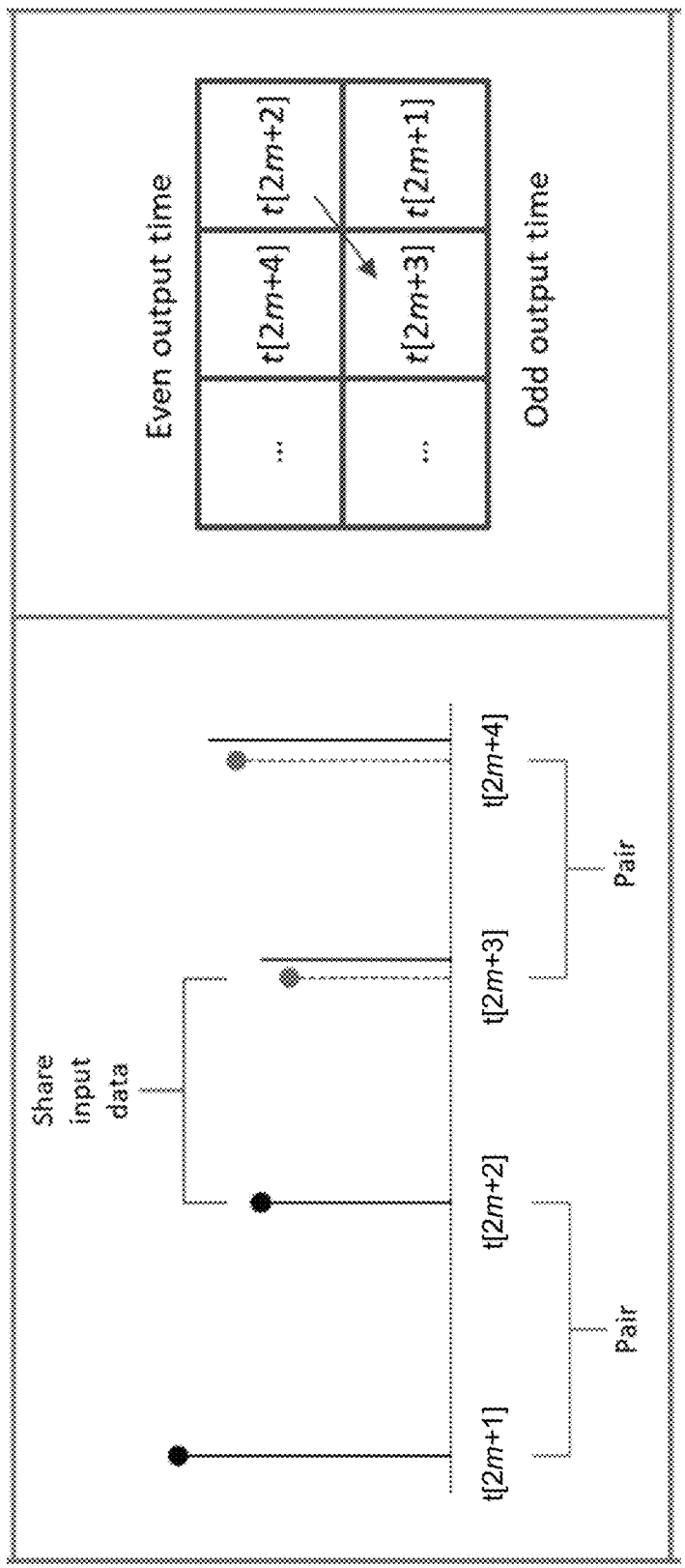

In some implementations, such as when the test system 110 operates with one sample per clock cycle (e.g., one input sample value and one output sample value per clock cycle), at a maximum interpolation ratio of 2, an input sample value may be valid for up to two output sample values (e.g., that are associated with two different output clock cycles). In some implementations, such as when the test system 110 operates with two sample values per clock cycle (e.g., two input sample values and two output sample values per clock cycle), at a maximum interpolation ratio of 2, one input sample may be reused by two output samples belonging to the same or different pairs of output sample times. For example, as shown in FIG. 5A, one input sample may be used to generate two output sample values for a first pair of output sample times (e.g., that includes output sample times t[2m] and t[2m+1], where t[2m] occurs before t[2m+1]), and a second input sample required for the following pair of output sample times (e.g., that includes output sample times t[2m+2] and t[2m+3], where t[2m+2] occurs before t[2m+3]). In some implementations, when the test system 110 operates with two sample values per clock cycle (e.g., two input sample values and two output sample values per clock cycle), at an interpolation ratio close to 1, one input sample may be used to generate two output samples corresponding to two different pairs of output sample times. For example, as shown in FIG. 5B, one input sample may be used to generate an output sample value for output sample time t[2m+1] of a first pair of output sample times (e.g., that includes output sample times t[2m] and t[2m+1], where t[2m] occurs before t[2m+1]) and another output sample value for output sample time t[2m+2] of a second pair of output sample times that includes output sample times t[2m+2] and t[2m+3], where t[2m+2] occurs before t[2m+3]). As another example, as shown in FIG. 5C, one input sample may be used to generate an output sample value for output sample time t[2m+2] of a first pair of output sample times (e.g., that includes output sample times t[2m+2] and t[2m+1], where t[2m+1] occurs before t[2m+2]) and another output sample value for output sample time t[2m+3] of a second pair of output sample times (e.g., that includes output sample times t[2m+4] and t[2m+3], where t[2m+3] occurs before t[2m+4]).

Accordingly, when the test system 110 operates with two sample values per clock cycle (e.g., two input sample values and two output sample values per clock cycle), the sequencer module 150 may obtain (e.g., by sending a Shift_input_even signal and a Shift_input_odd signal to the input sample counter module 140) two input sample counter values, such as the even input sample counter value $c_e[k]$ and the odd input sample counter value $c_o[k]$. Further, sequencer module 150 may obtain (e.g., by sending a Shift_output_even signal and a Shift_output_odd signal to the output time calculation data structure module 130) four output sample times, such as two even output sample times (e.g., output sample times t[2m] and t[2m+2]) and two odd output sample times (e.g., output sample times t[2n+1] and t[2n+3]). In this way, the sequencer module 150 may obtain output sample pairs t[2m], t[2m+2] and t[2n+1], t[2n+3]. Accordingly, the sequencer module 150 may compare each output sample time and each input sample counter value to determine a comparator value. For example, the sequencer module 150 may determine whether an integer portion of a bit representation of a particular output sample time (e.g., that includes 16 integer bits) matches (e.g., is equal to) a bit representation of a particular input sample counter value (e.g., that includes 16 integer bits) to determine a particular comparator value (e.g., that is 1 (one) when a match exists, or 0 (zero) when a match does not exist).

Figure 5D:
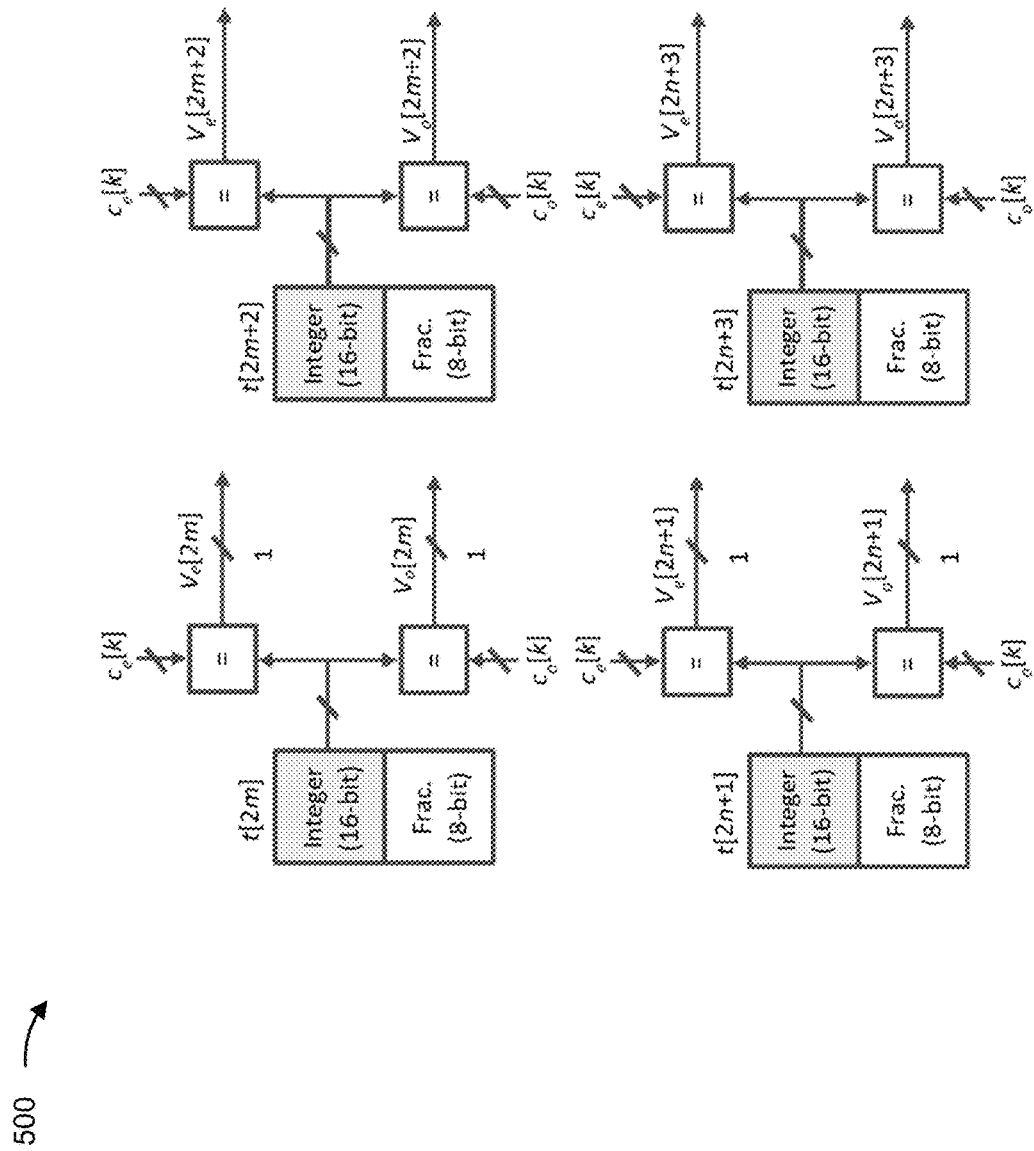

In a particular example, as shown in FIG. 5D, the output sample time t[2m] may be respectively compared with the even input sample counter value $c_e[k]$ and the odd input sample counter value $c_o[k]$ to determine the even comparator value $V_e[2m]$ and the odd comparator value $V_o[2m]$; the output sample time t[2m+2] may be respectively compared with the even input sample counter value $c_e[k]$ and the odd input sample counter value $c_o[k]$ to determine the even comparator value $V_e[2m+2]$ and the odd comparator value $V_o[2m+2]$; the output sample time t[2n+1] may be respectively compared with the even input sample counter value $c_e[k]$ and the odd input sample counter value $c_o[k]$ to determine the even comparator value $V_e[2n+1]$ and the odd comparator value $V_o[2n+1]$; and the output sample time t[2n+3] may be respectively compared with the even input sample counter value $c_e[k]$ and the odd input sample counter value $c_o[k]$ to determine the even comparator value $V_e[2n+3]$ and the odd comparator value $V_o[2n+3]$.

Figure 5E:
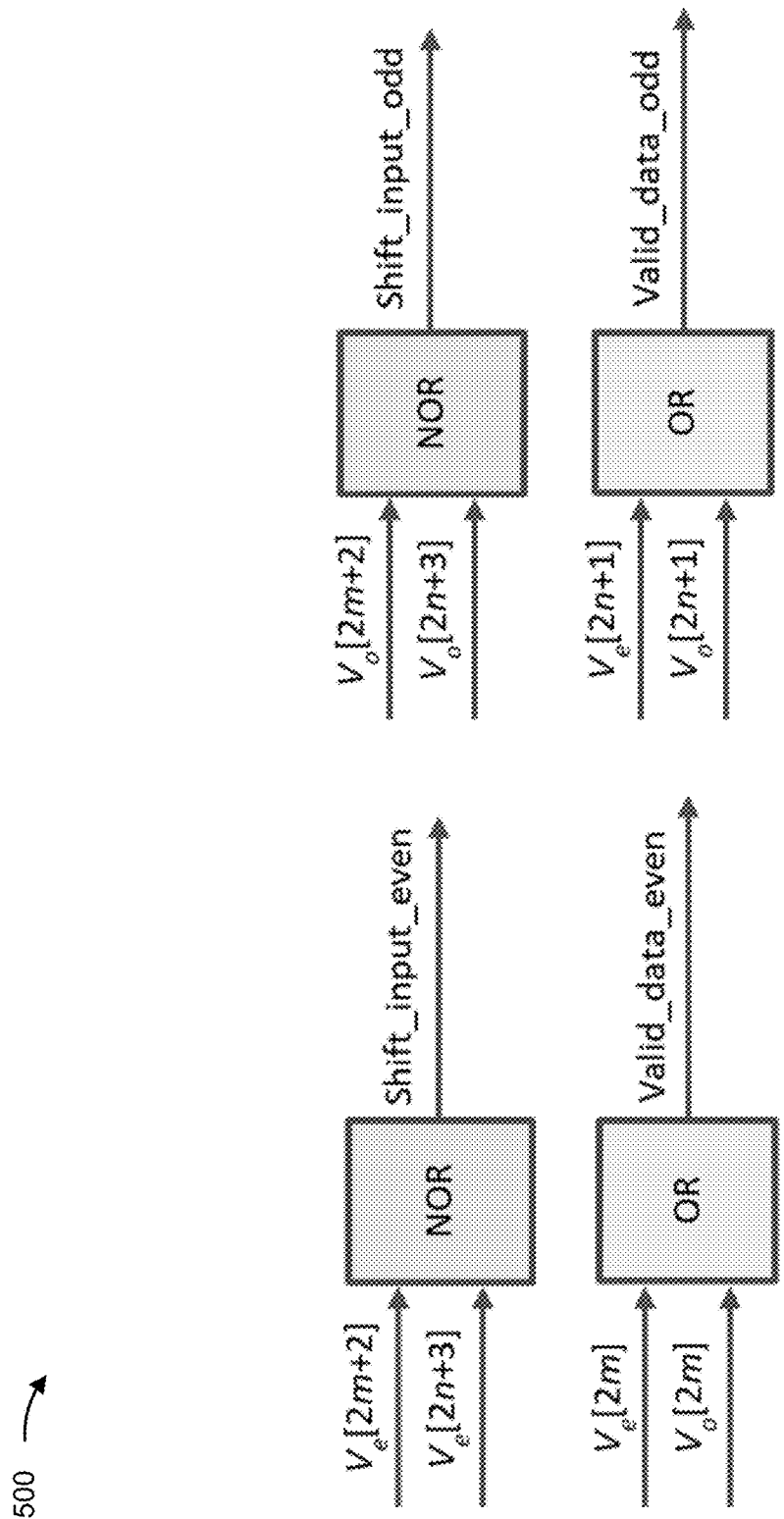

As shown in FIG. 5E, when the even comparator value $V_e[2m+2]$ and the even comparator value $V_e[2n+3]$ are both 0 (e.g., indicating that an output sample value cannot be calculated for the output sample time t[2m+2] and the output sample time t[2n+3] based on an input sample value that is associated with the even input sample counter value $c_e[k]$), the sequencer module 150 may generate an even input shift signal (e.g., a Shift_input_even signal, as a result of a "NOR" operation) indicating that the even input shift register of the test system 110 is to shift (e.g., to obtain a different input sample value from the even input shift register). As further shown in FIG. 5E, when the odd comparator value $V_o[2m+2]$ and the odd comparator value $V_o[2n+3]$ are both 0 (e.g., indicating that an output sample value cannot be calculated for the output sample time t[2m+2] and the output sample time t[2n+3] based on an input sample value that is associated with the odd input sample counter value $c_o[k]$), the sequencer module 150 may generate an odd input shift signal (e.g., a Shift_input_odd signal, as a result of a "NOR" operation) indicating that the odd input shift register of the test system 110 is to shift (e.g., to obtain a different input sample value from the odd input shift register). Accordingly, the sequencer module 150 may send the even input shift signal and/or the odd input shift signal to the polyphase interpolator module 160 to cause shifting of the even input shift register and/or the odd input shift register (e.g., as further described herein in relation to FIGS. 6A-6F). FIG. 5F shows a table that indicates when the even input shift register and/or the odd input shift register are to be shifted. For example, as shown in FIG. 5F, a particular input register (e.g., even or odd) is to be shifted when an output sample value cannot be calculated for the output sample time t[2m+2] and the output sample time t[2n+3] based on an input sample value that is associated with a particular input sample counter value (e.g., even or odd).

As further shown in FIG. 5E, when at least one of the even comparator value $V_e[2m]$ or the odd comparator value $V_o[2m]$ is 1 (e.g., indicating that an even output sample value can be calculated for the output sample time t[2m] based on an input sample value that is associated with at least one of the even counter value $c_e[k]$ or the odd input sample counter value $c_o[k]$), the sequencer module 150 may generate an even valid signal (e.g., a Valid_data_even signal, as a result of an "OR" operation) indicating that the even output sample value can be calculated (e.g., the even output sample value is valid) and therefore to be loaded into an even output sample FIFO of the test system 110. Additionally, or alternatively, when at least one of the even comparator value $V_e[2n+1]$ or the odd comparator value $V_o[2n+1]$ is 1 (e.g., indicating that an odd output sample value can be calculated for the output sample time t[2n+1] based on an input sample value that is associated with at least one of the even counter value $c_e[k]$ or the odd input sample counter value $c_o[k]$), the sequencer module 150 may generate an odd valid signal (e.g., a Valid_data_odd signal, as a result of an "OR" operation) indicating that odd output sample value can be calculated (e.g., the odd output sample value is valid) and therefore to be loaded into the odd output sample FiFO of the test system 110. The sequencer module 150 may therefore send the even valid signal and/or the odd valid signal to the output sample data structure 170 (e.g., to cause the even output sample and/or the odd output sample, that are respectively generated by the polyphase interpolator module 160 for output sample time t[2m] and/or output sample time t[2n+1], to be loaded into the output sample data structure 170, as further described herein in relation to FIG. 7).

In some implementations, based on sending the even valid signal, the sequencer module 150 may send (e.g., to the output time calculation data structure module 130) an even shift signal (e.g., a Shift_output_even signal) to cause the even output sample time FIFO and shift register to shift by one even output sample time with the next clock cycle, which updates t[2m] and t[2m+2] to the sequencer module 150. Additionally, or alternatively, based on sending the odd valid signal, the sequencer module 150 may send (e.g., to the output time calculation data structure module 130) an odd shift signal (e.g., a Shift_output_odd signal) to cause the odd output sample time FIFO and shift register to shift by one odd output sample time with the next clock cycle, which updates t[2n+1] and t[2n+3] to the sequencer module 150. In this way, the sequencer module 150 may be able to process up to two new output sample times, as described above.

As indicated above, FIGS. 5A-5F are provided merely as one or more examples. Other examples may differ from what is described with regard to FIGS. 5A-5F.

FIGS. 6A-6F are diagrams of one or more example implementations 600 associated with the polyphase interpolator module 160 of the test system 110 described herein. As described herein in relation to FIG. 1A, the polyphase interpolator module 160 may generate output sample values for one or more respective output sample times.

In some implementations, the polyphase interpolator module 160 may determine an output sample value $y(t_{arb})$, for an arbitrary sample time $t_{arb}=m/F_{Sin}+\Delta t_{arb}$ (where m is an integer, $F_{Sin}$ is the input sample rate, and $\Delta t_{arb}$ is an arbitrary time offset), by selecting a closest sample time $n/(M \cdot F_{Sin})$ (where n is an integer and M is the interpolation factor) generated by the polyphase interpolator module 160, which processes an input sample value of the test system 110. This may be equivalent to, or similar to, applying a zero-order hold to an output of the polyphase interpolator module 160 and resampling at the arbitrary sample time $t_{arb}$.

Figure 6A:
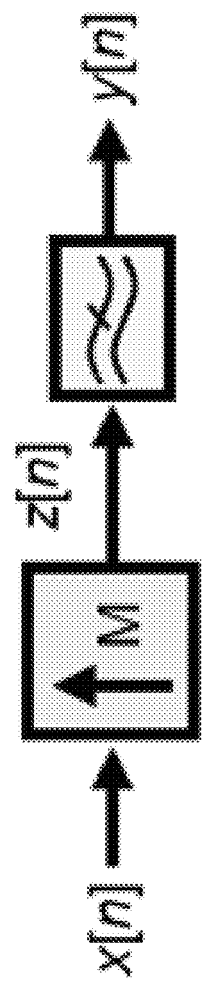
Figure 6B:
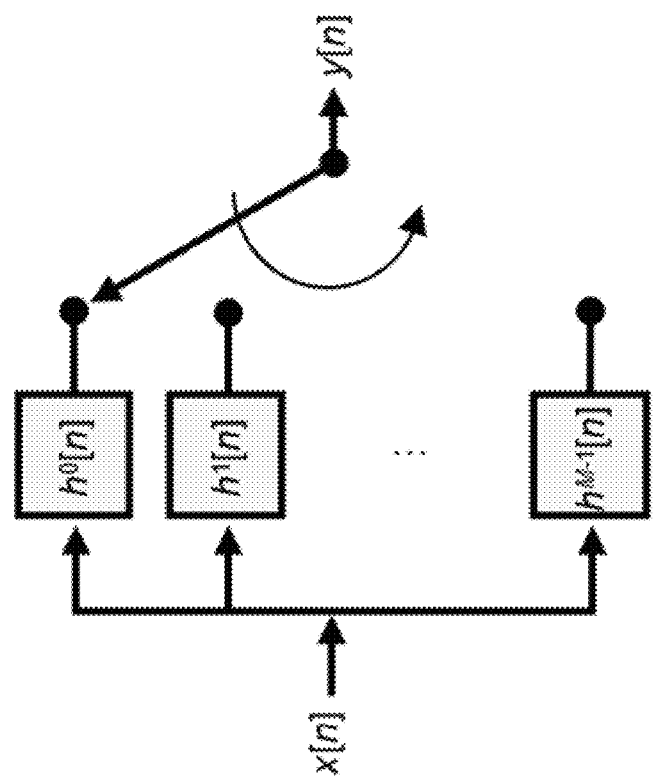

As shown in FIG. 6A, the polyphase interpolator module 160 may include a polyphase interpolator (e.g., by M) that comprises an upsampler stage, followed by a finite impulse response (FIR) filter (e.g., with coefficients $b_i$, i=0, . . . , $N_{FIR}$, where $N_{FIR} \geq 1$). As shown in FIG. 6B, the FIR filter may include M branch filters $h^j[n]$. The coefficients of the M branch filters $h^j[n]$ may be given by $$h^j[n]=M \cdot b_{j+M \cdot i}, \text{ where } j=0 \ldots M-1 \text{ and } j+M \cdot i \leq N_{FIR} \qquad \text{Eq.3}$$

In some implementations, the branch filters may be driven concurrently (e.g., at a same time, or nearly a same time) by an input sample value x[n] at $F_{Sin}$, and the interpolator may include a switch that samples respective outputs of the branch filters at $M \cdot F_{Sin}$. In some implementations, the interpolator may be configured to operate with two samples per clock cycle (e.g., two input sample values, as described herein).

Figure 6C:

FIG. 6C shows example passband and stopband edges for the FIR filter, such as for a transmitter of the test system 110 (e.g., that is associated with an input sample rate of $F_{Sin}$=491.52 MSPS) and for a receiver of the test system 110 (e.g., that is associated with an input sample rate of $F_{Sin}$=500 MSPS).

Figure 6D:
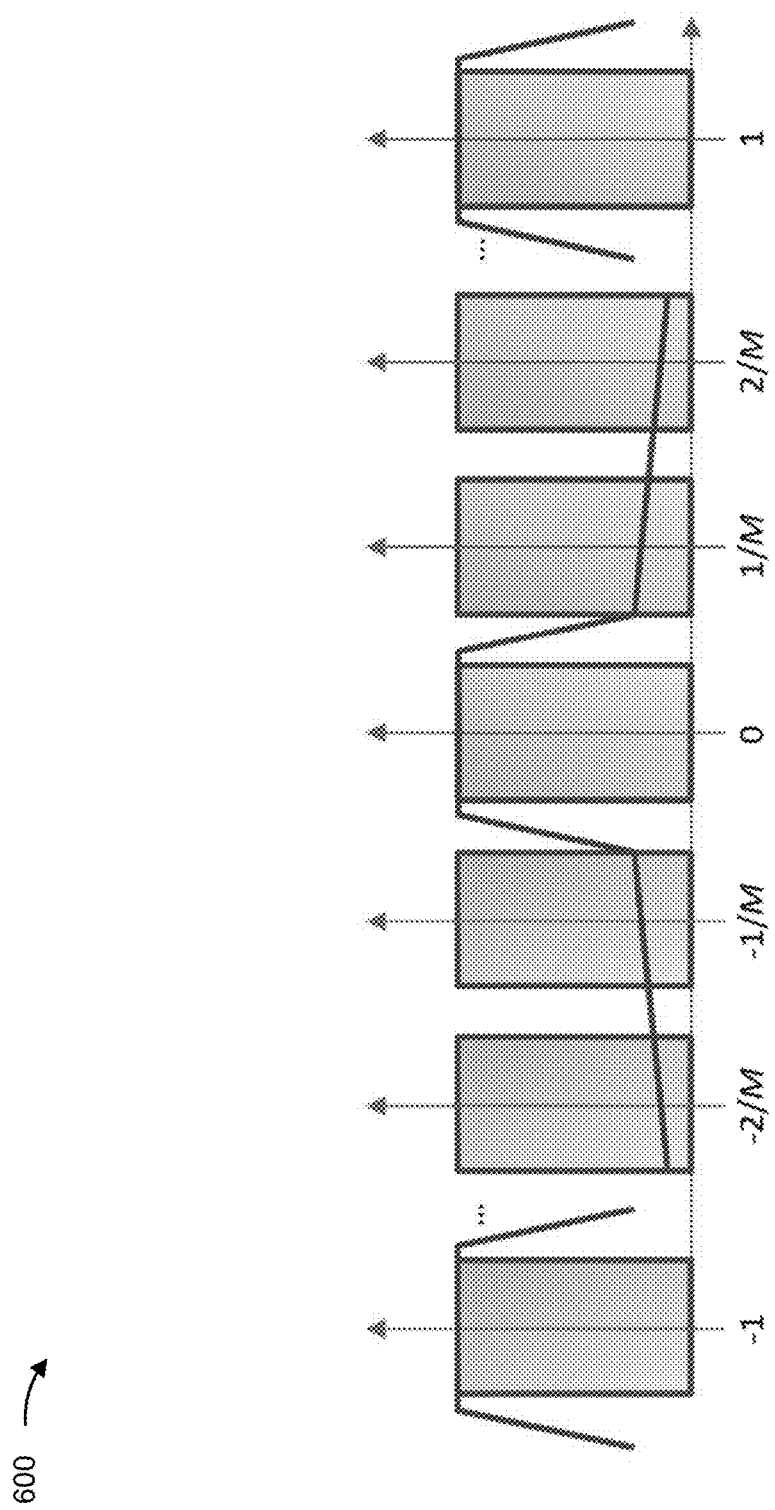
Figure 6E:

As shown in FIG. 6D, the FIR filter may attenuate an image produced by an upsample process of the interpolator. Otherwise, multiple images may overlap in a±$F_{Sout}$/2 frequency range (where $F_{Sout}$ is the output sample rate of the test system 110), which may lead to degraded spurious rejection by the test system 110. As shown in FIG. 6E, the FIR filter may provide an out-of-band attenuation that is greater than or equal to 50, 60, 70, 80, and/or 90 decibels (dB), among other examples (e.g., for resampling from $F_{Sin}$=491.52 MSPS to $F_{Sout}$=500 MSPS with M=256). As shown in FIG. 6E, this may provide an optimal filter order of the FIR filter and/or an optimal branch order of the branch filters.

Figure 6F:
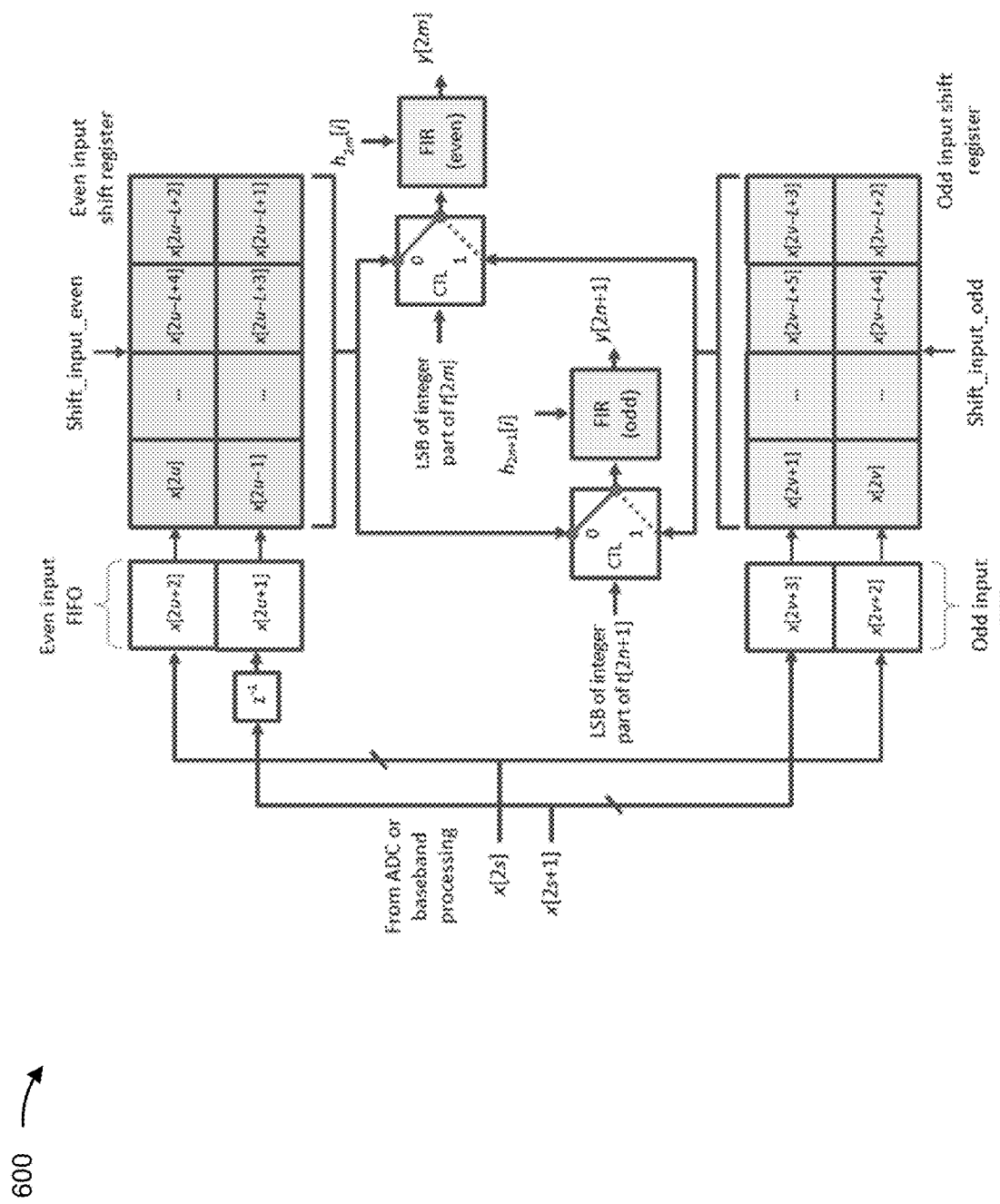

FIG. 6F shows an example block diagram of the polyphase interpolator. As shown in FIG. 6F, to produce up to two output sample values per clock cycle, the polyphase interpolator may include two input shift registers (e.g., an even input shift register and an odd input shift register). A length of each input shift register may be L (e.g., each input shift register may hold up to L input sample values), where L is a number of taps of each branch of the FIR filter.

Each input shift register may be configured to shift independently (and thereby take in a new input sample value). For example, the even input shift register may be configured to shift based on receiving an even shift signal (e.g., a Shift_input_even signal) from the sequencer module 150, and the odd input shift register may be configured to shift based on receiving an odd shift signal (e.g., a Shift_input_odd signal) from the sequencer module 150. In this way, each input shift register may respectively provide an input sample value for generating an output sample value, as described herein.

As further shown in FIG. 6F, each input shift register may be preceded by an input FIFO. For example, the even input shift register may be preceded by an even input FIFO, and the odd input shift register may be preceded by an odd input FIFO. Each input FIFO may be configured to store new input sample values when a corresponding input shift register does not shift. The even input FIFO may be loaded with input samples x[2s] and x[2s−1], and the odd input FIFO may be loaded with input samples x[2s+1] and x[2s].

As further shown in FIG. 6F, the polyphase interpolator may include two FIR filters (e.g., an even FIR filter and an odd FIR filter). The even FIR filter may be configured to generate an even output sample value y[2m] (e.g., that corresponds to the output sample time t[2m]) and/or the odd FIR filter may be configured to generate an odd output sample value y[2n+1] (e.g., that corresponds to the output sample time t[2n+1]). Each FIR filter may switch between using the even input shift register and the odd input shift register as a source based on a least significant bit (LSB) of the integer part of the output sample time associated with the corresponding FIR filter. For example, the even FIR filter may switch between using the even input shift register and the odd input shift register as a source of the even FIR filter, to generate the even output sample value y[2m], based on an LSB of the integer part of the output sample time t[2m], and the odd FIR filter may switch between using the even input shift register and the odd input shift register as a source of the odd FIR filter, to generate the odd output sample value y[2n+1], based on an LSB of the integer part of the output sample time t[2n+1]. Accordingly, each FIR filter may include multipliers, adders, or other components, to generate an output sample without additional memory resources (i.e., because the input shift registers act as memory resources of the FIR filter).

As shown in FIG. 6G, the polyphase interpolator may include a lookup table (LUT) that stores coefficients of the M branches of the FIR filter of the interpolator. A fractional portion of a bit representation (e.g., that includes 8 fractional bits) of each of the output sample time t[2m] and the output sample time t[2n+1] provide LUT addresses of the LUT. Accordingly, the coefficients $h_{2m}[i]$ and $h_{2n+1}[i]$ may be respectively selected for the even and odd FIR filters to generate the even output sample value y[2m] and the odd output sample value y[2n+1].

Figure 7:
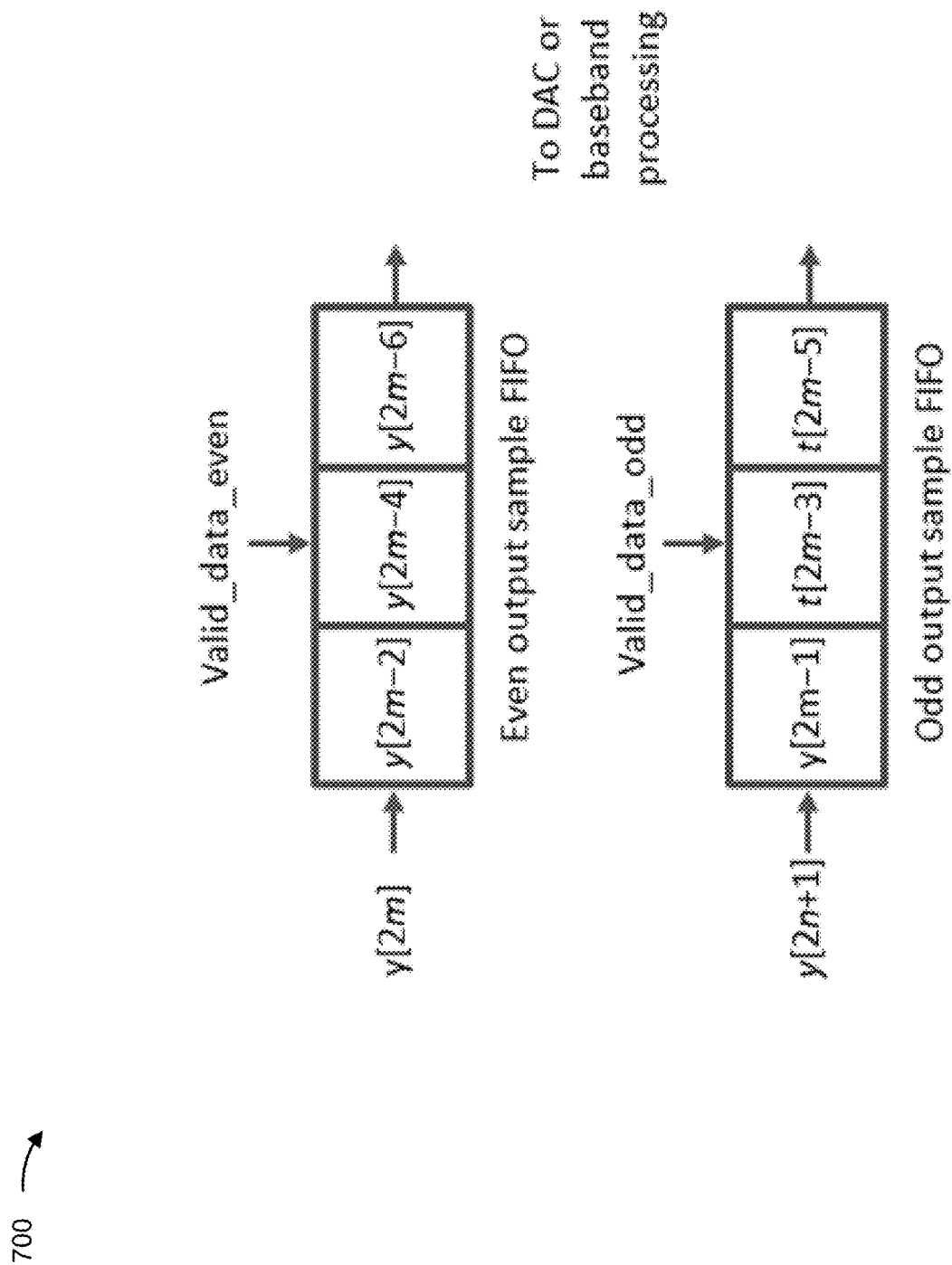
FIG. 7 is a diagram of one or more example implementations associated with an output sample data structure module of the test system described herein.

In some implementations, the polyphase interpolator module 160 may send the even output sample value y[2m] and the odd output sample value y[2n+1] to the output sample data structure 170 to be stored in the output sample data structure 170 (e.g., as further described herein in relation to FIG. 7).

As indicated above, FIGS. 6A-6G are provided merely as one or more examples. Other examples may differ from what is described with regard to FIGS. 6A-6G.

FIG. 7 is a diagram of one or more example implementations 700 associated with the output sample data structure 170 of the test system 110 described herein. As described herein in relation to FIG. 1A, the even output sample value y[2m] and the odd output sample value y[2n+1] may be stored in the output sample data structure 170. For example, as shown in FIG. 7, the even output sample value y[2m] may be stored in an even output sample FIFO and the odd output sample value y[2n+1] may be stored in an odd output sample FIFO.

As further shown in FIG. 7, each FIFO may include (e.g., store) one or more other output sample values (e.g., that were previously generated by the polyphase interpolator module 160). For example, the even output sample FIFO may include one or more other even output sample values, such as output sample values y[2m−2], y[2m−4], y[2m−6], and so on (e.g., in least amount of time in FIFO order), and the odd output sample time FIFO may include one or more other odd output sample values, such as output sample values y[2m−1], y[2m−3], y[2m−5], and so on (e.g., in least amount of time in FIFO order).

In some implementations, the sequencer module 150 may send signals to the output sample data structure 170 to cause storage of the even output sample value y[2m] and the odd output sample value y[2n+1]. For example, the sequencer module 150 may send an even valid signal (e.g., a Valid_data_even signal) to the output sample data structure 170 to cause the even output sample FIFO to store the even output sample value y[2m] (e.g., when the even output sample value y[2m] is received from the polyphase interpolator module 160), and the sequencer module 150 may send an odd valid signal (e.g., a Valid_data_odd signal) to the output sample data structure 170 to cause the odd output sample FIFO to store the odd output sample value y[2n+1] (e.g., when the odd output sample value y[2n+1] is received from the polyphase interpolator module 160).

As further shown in FIG. 7, the output sample FIFOs may provide pairs of output sample values (e.g., that include an even output sample value and an odd output sample value) to a digital-to-analog converter (DAC), or another baseband processing component, of the test system 110. In some implementations, because the output sample FIFOs hold even output samples and odd output samples for a period of time before providing the pairs of output samples, a pair of output sample values may include an even output sample value and an odd output sample value that are associated with different clock cycles (e.g., because the test system 110 performed a decimation process, rather than interpolation process). By means of the output sample FIFOs the test system 110 may also reconcile the clock frequency used to the implement the arbitrary resampler (e.g., in the FPGA associated with the test system 110) with a data rate of a DAC (in the transmitter), or other baseband processing component (e.g., in the receiver).

As indicated above, FIG. 7 is provided merely as one or more examples. Other examples may differ from what is described with regard to FIG. 7.

Figure 8:
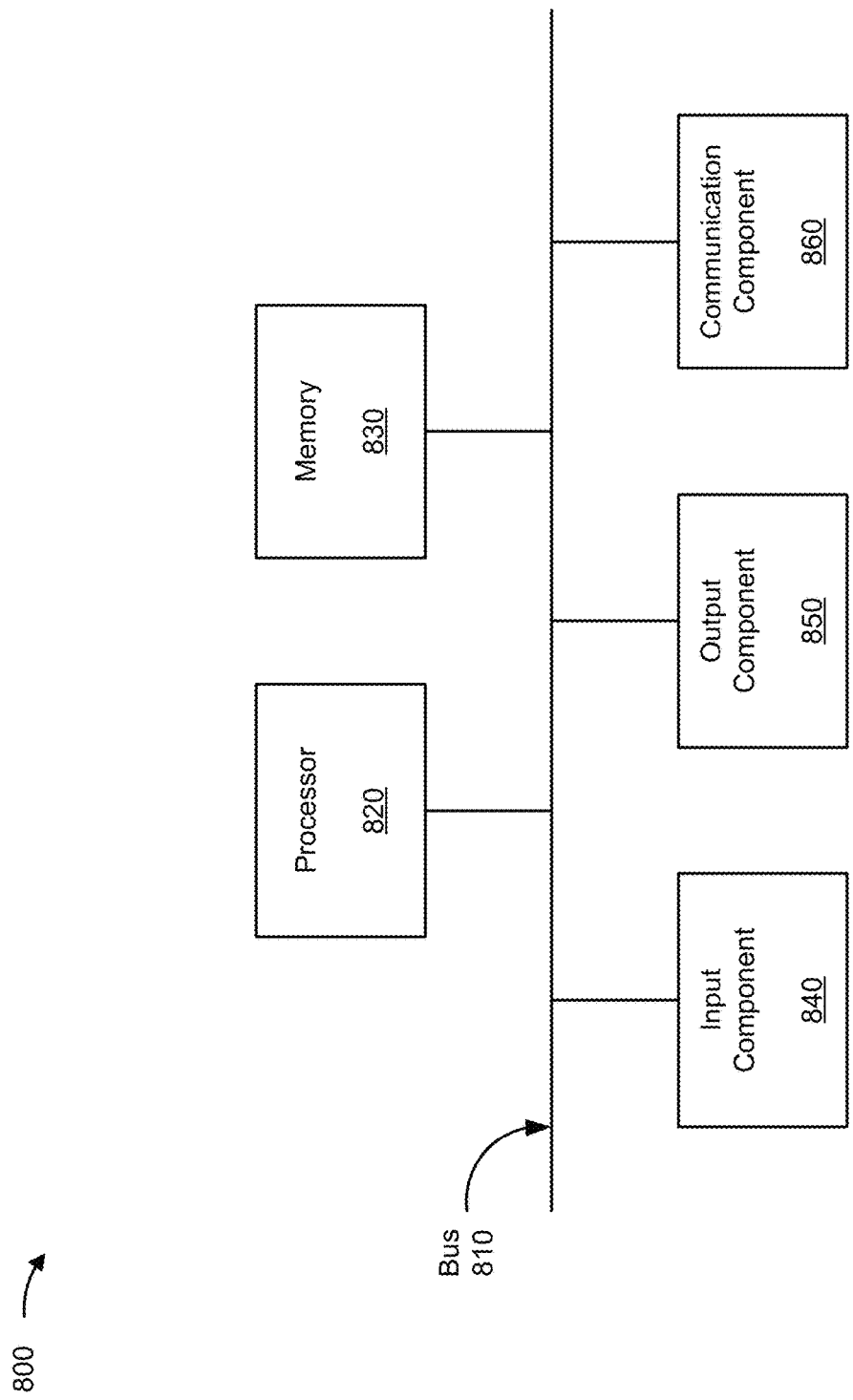
FIG. 8 is a diagram of example components of one or more devices described herein.

FIG. 8 is a diagram of example components of a device 800, which may correspond to the test system 110, the output time calculation module 120, the output time calculation data structure module 130, the input sample counter module 140, the sequencer module 150, the polyphase interpolator module 160, and/or the output sample data structure 170. In some implementations, the test system 110, the output time calculation module 120, the output time calculation data structure module 130, the input sample counter module 140, the sequencer module 150, the polyphase interpolator module 160, and/or the output sample data structure 170 include one or more devices 800 and/or one or more components of device 800. As shown in FIG. 8, device 800 may include a bus 810, a processor 820, a memory 830, an input component 840, an output component 850, and a communication component 860.

Bus 810 includes one or more components that enable wired and/or wireless communication among the components of device 800. Bus 810 may couple together two or more components of FIG. 8, such as via operative coupling, communicative coupling, electronic coupling, and/or electric coupling. Processor 820 includes a central processing unit, a graphics processing unit, a microprocessor, a controller, a microcontroller, a digital signal processor, a field-programmable gate array, an application-specific integrated circuit, and/or another type of processing component. Processor 820 is implemented in hardware, firmware, or a combination of hardware and software. In some implementations, processor 820 includes one or more processors capable of being programmed to perform one or more operations or processes described elsewhere herein.

Memory 830 includes volatile and/or nonvolatile memory. For example, memory 830 may include random access memory (RAM), read only memory (ROM), a hard disk drive, and/or another type of memory (e.g., a flash memory, a magnetic memory, and/or an optical memory). Memory 830 may include internal memory (e.g., RAM, ROM, or a hard disk drive) and/or removable memory (e.g., removable via a universal serial bus connection). Memory 830 may be a non-transitory computer-readable medium. Memory 830 stores information, instructions, and/or software (e.g., one or more software applications) related to the operation of device 800. In some implementations, memory 830 includes one or more memories that are coupled to one or more processors (e.g., processor 820), such as via bus 810.

Input component 840 enables device 800 to receive input, such as user input and/or sensed input. For example, input component 840 may include a touch screen, a keyboard, a keypad, a mouse, a button, a microphone, a switch, a sensor, a global positioning system sensor, an accelerometer, a gyroscope, and/or an actuator. Output component 850 enables device 800 to provide output, such as via a display, a speaker, and/or a light-emitting diode. Communication component 860 enables device 800 to communicate with other devices via a wired connection and/or a wireless connection. For example, communication component 860 may include a receiver, a transmitter, a transceiver, a modem, a network interface card, and/or an antenna.

Device 800 may perform one or more operations or processes described herein. For example, a non-transitory computer-readable medium (e.g., memory 830) may store a set of instructions (e.g., one or more instructions or code) for execution by processor 820. Processor 820 may execute the set of instructions to perform one or more operations or processes described herein. In some implementations, execution of the set of instructions, by one or more processors 820, causes the one or more processors 820 and/or the device 800 to perform one or more operations or processes described herein. In some implementations, hardwired circuitry is used instead of or in combination with the instructions to perform one or more operations or processes described herein. Additionally, or alternatively, processor 820 may be configured to perform one or more operations or processes described herein. Thus, implementations described herein are not limited to any specific combination of hardware circuitry and software.

The number and arrangement of components shown in FIG. 8 are provided as an example. Device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

Figure 9:
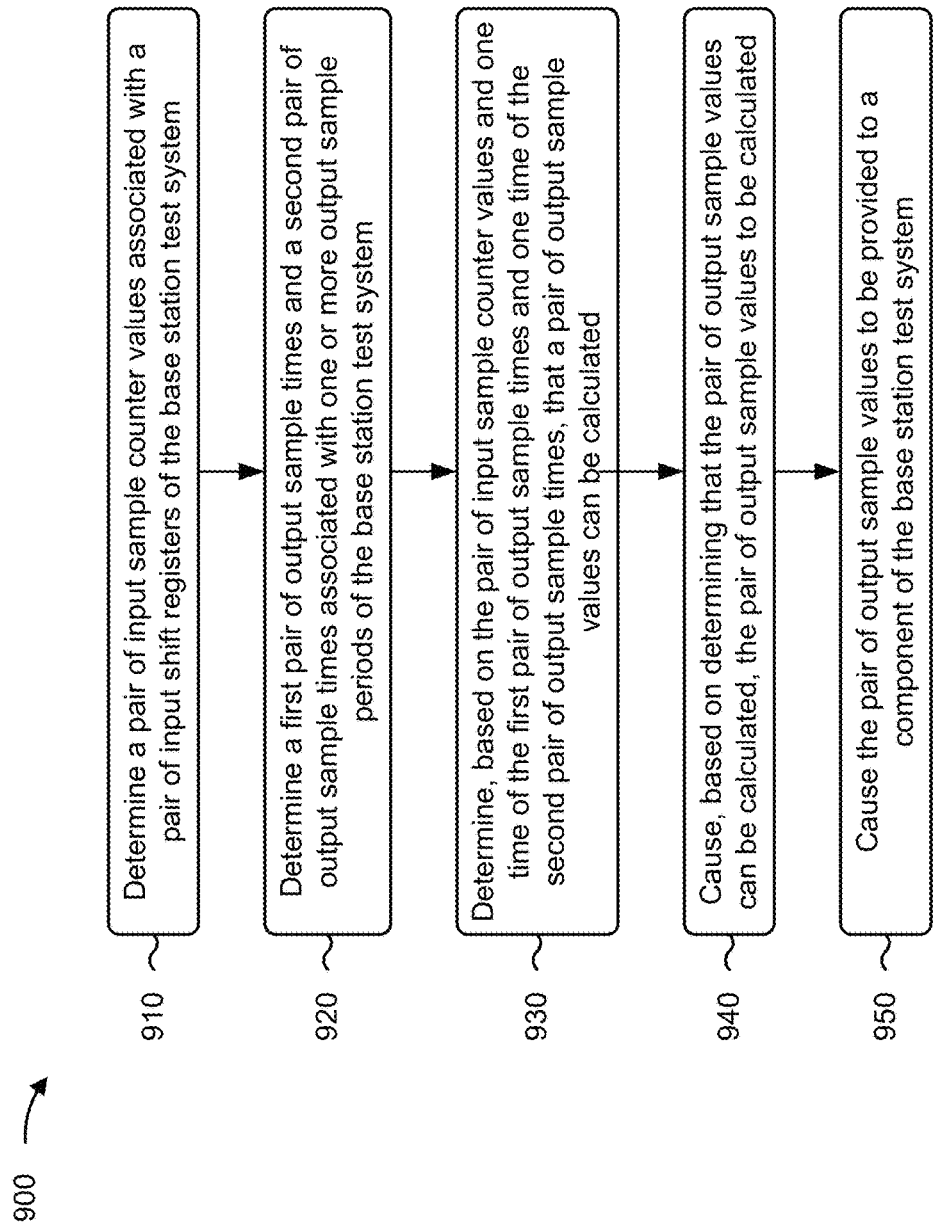
FIG. 9 is a flowchart of an example process relating to a base station test system for providing variable arbitrary resample functionality.

FIG. 9 is a flowchart of an example process 900 associated with a base station test system for providing variable arbitrary resample functionality. In some implementations, one or more process blocks of FIG. 9 are performed by a base station test system (e.g., test system 110). In some implementations, one or more process blocks of FIG. 9 are performed by another device or a group of devices separate from or including the base station test system, such as the output time calculation module 120, the output time calculation data structure module 130, the input sample counter module 140, the sequencer module 150, the polyphase interpolator module 160, and/or the output sample data structure 170. Additionally, or alternatively, one or more process blocks of FIG. 9 may be performed by one or more components of device 800, such as processor 820, memory 830, input component 840, output component 850, and/or communication component 860.

As shown in FIG. 9, process 900 may include determining a pair of input sample counter values associated with a pair of input shift registers of the base station test system (block 910). For example, the base station test system may determine a pair of input sample counter values associated with a pair of input shift registers of the base station test system, as described above.

As further shown in FIG. 9, process 900 may include determining a first pair of output sample times and a second pair of output sample times associated with one or more output sample periods of the base station test system (block 920). For example, the base station test system may determine a first pair of output sample times and a second pair of output sample times associated with one or more output sample periods of the base station test system, as described above. In some implementations, the first pair of output sample times and the second pair of output sample times may each be associated with two output sample periods of the base station test system.

As further shown in FIG. 9, process 900 may include determining, based on the pair of input sample counter values and one time of the first pair of output sample times and one time of the second pair of output sample times, that a pair of output sample values can be calculated (block 930). For example, the base station test system may determine, based on the pair of input sample counter values and one time of the first pair of output sample times and one time of the second pair of output sample times, that a pair of output sample values can be calculated, as described above.

As further shown in FIG. 9, process 900 may include causing, based on determining that the pair of output sample values can be calculated, the pair of output sample values to be calculated (block 940). For example, the base station test system may cause, based on determining that the pair of output sample values can be calculated, the pair of output sample values to be calculated, as described above.

As further shown in FIG. 9, process 900 may include causing the pair of output sample values to be provided to a component of the base station test system (block 950). For example, the base station test system may cause the pair of output sample values to be provided to a component of the base station test system, as described above.

Process 900 may include additional implementations, such as any single implementation or any combination of implementations described below and/or in connection with one or more other processes described elsewhere herein.

In a first implementation, the pair of input sample counter values includes a first input sample counter value and a second input sample counter value, wherein determining the pair of input sample counter values includes causing a first input sample counter of the base station test system to provide the first input sample counter value, and causing a second input sample counter of the base station test system to provide the second input sample counter value, wherein the first input sample counter value indicates a number of first input sample values shifted into a first input shift register of the pair of input shift registers of the base station test system, and wherein the second input sample counter value indicates a number of second input sample values shifted into a second input shift register of the pair of input shift registers of the base station test system.

In a second implementation, alone or in combination with the first implementation, causing the base station test system to determine the first pair of output sample times and the second pair of output sample times includes generating and providing a first signal to cause a first data structure to provide the first pair of output sample times, and generating and providing a second signal to cause a second data structure to provide the second pair of output sample times.

In a third implementation, alone or in combination with one or more of the first and second implementations, process 900 includes generating, based on causing at least one of the first data structure to provide the first pair of output sample times or the second data structure to provide the second pair of output sample times, a first output sample time and a second output sample time that are associated with another output sample period, storing the first output sample time in the first data structure, and storing the second output sample time in the second data structure.

In a fourth implementation, alone or in combination with one or more of the first through third implementations, generating the first output sample time and the second output sample time includes generating a first output sample time instant and a second output sample time instant that are associated with the other output sample period, and generating the first output sample time and the second output sample time by respectively rounding the first output sample time instant and the second output sample time instant, wherein the first output sample time instant and the second output sample time instant are each represented by a first number of fractional bits, and the first output sample time and the second output sample time are each represented by a second number of fractional bits, wherein the first number is greater than the second number.

In a fifth implementation, alone or in combination with one or more of the first through fourth implementations, determining that the pair of output sample values can be calculated includes identifying an output sample time of the first pair of output sample times or the second pair of output sample times; comparing the output sample time and a first input sample counter value of the pair of input sample counter values to determine a first comparator value, wherein the first comparator value indicates whether the output sample time matches the first input sample counter value; comparing the output sample time and a second input sample counter value of the pair of input sample counter values to determine a second comparator value, wherein the second comparator value indicates whether the output sample time matches the second input sample counter value; and determining, based on at least one of the first comparator value or the second comparator value indicating that a match exists, that an output sample value that corresponds to the output sample time can be calculated.

In a sixth implementation, alone or in combination with one or more of the first through fifth implementations, the pair of output sample values includes a first output sample value and a second output sample value, and causing the pair of output sample values to be calculated includes generating and providing a first signal to cause a first finite impulse response (FIR) filter, of a polyphase interpolator of the base station test system, to generate, based on one or more input sample values stored in one of the pair of input shift registers, the first output sample value, and generating and providing a second signal to cause a second FIR filter to generate, based on one or more other input sample values stored in one of the pair of input shift registers, the second output sample value. In some implementations, the first FIR filter and the second FIR filter respectively generate, in parallel, the first output sample value and the second output sample value. Additionally, or alternatively, the first FIR filter and the second FIR filter respectively generate, during a clock cycle used by the base station test system for signal processing, the first output sample value and the second output sample value.

In a seventh implementation, alone or in combination with one or more of the first through sixth implementations, wherein the pair of output sample values are calculated using a pair of FIR filters of a polyphase interpolator of the base station test system, and process 900 includes refraining from causing one or both of the pair of FIR filters of the polyphase interpolator from generating another output sample value.

In an eighth implementation, alone or in combination with one or more of the first through seventh implementations, causing the pair of output sample values to be provided to a component of the base station test system includes generating and provide one or more signals to cause the pair of output sample values to be stored in respective data structures, wherein causing the pair of output sample values to be stored in the respective data structures is to enable the pair of output sample values to be obtained by the component of the base station test system.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station test system, comprising:
   one or more memories; and
   one or more processors, communicatively coupled to the one or more memories, configured to:
   determine a pair of input sample counter values associated with a pair of input shift registers of the base station test system;
   determine a first pair of output sample times and a second pair of output sample times associated with one or more output sample periods of the base station test system;
   determine, based on the pair of input sample counter values and one time of the first pair of output sample times and one time of the second pair of output sample times, that a pair of output sample values can be calculated;
   cause, based on determining that the pair of output sample values can be calculated, the pair of output sample values to be calculated; and
   cause the pair of output sample values to be provided to a component of the base station test system.

2. The base station test system of claim 1, wherein the pair of input sample counter values includes a first input sample counter value and a second input sample counter value,
   wherein the one or more processors, to determine the pair of input sample counter values, are configured to:
   cause a first input sample counter of the base station test system to provide the first input sample counter value; and
   cause a second input sample counter of the base station test system to provide the second input sample counter value,
      wherein the first input sample counter value indicates a number of first input sample values shifted into a first input shift register of the pair of input shift registers of the base station test system, and
      wherein the second input sample counter value indicates a number of second input sample values shifted into a second input shift register of the pair of input shift registers of the base station test system.

3. The base station test system of claim 1, wherein the one or more processors, to determine the first pair of output sample times and the second pair of output sample times, are configured to:
   generate and provide a first signal to cause a first data structure to provide the first pair of output sample times; and
   generate and provide a second signal to cause a second data structure to provide the second pair of output sample times.

4. The base station test system of claim 3, wherein the one or more processors are further configured to:
   generate, based on causing at least one of the first data structure to provide the first pair of output sample times or the second data structure to provide the second pair of output sample times, a first output sample time and a second output sample time that are associated with another output sample period;
   store the first output sample time in the first data structure; and
   store the second output sample time in the second data structure.

5. The base station test system of claim 4, wherein the one or more processors, to generate the first output sample time and the second output sample time, are configured to:
   generate a first output sample time instant and a second output sample time instant that are associated with the other output sample period; and
   generate the first output sample time and the second output sample time by respectively rounding the first output sample time instant and the second output sample time instant,
      wherein the first output sample time instant and the second output sample time instant are each represented by a first number of fractional bits, and the first output sample time and the second output sample time are each represented by a second number of fractional bits,
      wherein the first number is greater than the second number.

6. The base station test system of claim 1, wherein the one or more processors, to determine that the pair of output sample values can be calculated, are configured to:
   identify an output sample time of the first pair of output sample times or the second pair of output sample times;
   compare the output sample time and a first input sample counter value of the pair of input sample counter values to determine a first comparator value,
      wherein the first comparator value indicates whether the output sample time matches the first input sample counter value;
   compare the output sample time and a second input sample counter value of the pair of input sample counter values to determine a second comparator value,
      wherein the second comparator value indicates whether the output sample time matches the second input sample counter value; and
   determine, based on at least one of the first comparator value or the second comparator value indicating that a match exists, that an output sample value that corresponds to the output sample time can be calculated.

7. The base station test system of claim 1, wherein the pair of output sample values includes a first output sample value and a second output sample value,
   wherein the one or more processors, to cause the pair of output sample values to be calculated, are configured to:

generate and provide a first signal to cause a first finite impulse response (FIR) filter, of a polyphase interpolator of the base station test system, to generate, based on one or more input sample values stored in one of the pair of input shift registers, the first output sample value; and generate and provide a second signal to cause a second FIR filter to generate, based on one or more other input sample values stored in one of the pair of input shift registers, the second output sample value.

8. The base station test system of claim 7, wherein the pair of output sample values are calculated using a pair of finite impulse response (FIR) filters of a polyphase interpolator of the base station test system, wherein the one or more processors are further configured to refrain from causing one or both of the pair of FIR filters of the polyphase interpolator from generating another output sample value.

9. The base station test system of claim 1, wherein the one or more processors, to cause the pair of output sample values to be provided to a component of the base station test system, are configured to:

generate and provide one or more signals to cause the pair of output sample values to be stored in respective data structures,
wherein causing the pair of output sample values to be stored in the respective data structures is to enable the pair of output sample values to be obtained by the component of the base station test system.

10. A non-transitory computer-readable medium storing a set of instructions, the set of instructions comprising:

one or more instructions that, when executed by one or more processors of a base station test system, cause the base station test system to:
determine a first pair of output sample times and a second pair of output sample times;
determine, based on one time of the first pair of output sample times and one time of the second pair of output sample times, that a pair of output sample values can be calculated;
cause, based on determining that the pair of output sample values can be calculated, the pair of output sample values to be calculated; and
cause the pair of output sample values to be provided to a component of the base station test system.

11. The non-transitory computer-readable medium of claim 10, wherein the one or more instructions, that cause the base station test system to determine the first pair of output sample times and the second pair of output sample times, cause the base station test system to:
cause a first data structure to provide the first pair of output sample times; and
cause a second data structure to provide the second pair of output sample times.

12. The non-transitory computer-readable medium of claim 10, wherein the one or more instructions, that cause the base station test system to determine that the pair of output sample values can be calculated, cause the base station test system to:
identify an output sample time of the first pair of output sample times or the second pair of output sample times;
compare the output sample time and a first input sample counter value associated with a first input shift register of the base station test system to determine a first comparator value;
compare the output sample time and a second input sample counter value associated with a second input shift register of the base station test system to determine a second comparator value; and
determine, based on at least one of the first comparator value or the second comparator value, that an output sample value that corresponds to the output sample time can be calculated.

13. The non-transitory computer-readable medium of claim 10, wherein the pair of output sample values includes a first output sample value and a second output sample value,
wherein the one or more processors, to cause the pair of output sample values to be calculated, are configured to:
cause a first finite impulse response (FIR) filter of a polyphase interpolator of the base station test system to generate the first output sample value; and
cause a second FIR filter of the polyphase interpolator to generate the second output sample value.

14. The non-transitory computer-readable medium of claim 13, wherein the first FIR filter and the second FIR filter respectively generate, in parallel, the first output sample value and the second output sample value.

15. The non-transitory computer-readable medium of claim 13, wherein the first FIR filter and the second FIR filter respectively generate, during a clock cycle used by the base station test system for signal processing, the first output sample value and the second output sample value.

16. The non-transitory computer-readable medium of claim 10, wherein the one or more processors, to cause the pair of output sample values to be provided to a component of the base station test system, are configured to:
cause the pair of output sample values to be stored in respective data structures to enable the pair of output sample values to be obtained by the component of the base station test system.

17. A method, comprising:
determining, by a base station test system and based on one time of a first pair of output sample times and one time of a second pair of output sample times, that a pair of output sample values can be calculated;
causing, by the base station test system and based on determining that the pair of output sample values can be calculated, the pair of output sample values to be calculated; and
causing, by the base station test system, the pair of output sample values to be provided.

18. The method of claim 17, wherein the first pair of output sample times and the second pair of output sample times are each associated with two output sample periods of the base station test system.

19. The method of claim 17, wherein the pair of output sample values includes a first output sample value and a second output sample value,
wherein causing the pair of output sample values to be calculated comprises:
causing respective finite impulse response (FIR) filters of a polyphase interpolator of the base station test system to generate the first output sample value and the second output sample value.

20. The method of claim 17, wherein causing the pair of output sample values to be provided comprises:
causing the pair of output sample values to be stored in respective data structures,
wherein causing the pair of output sample values to be stored in the respective data structures is to enable the pair of output sample values to be obtained by a component of the base station test system.

\* \* \* \* \*